(12) United States Patent
Thakur et al.

(10) Patent No.: US 12,365,480 B2
(45) Date of Patent: Jul. 22, 2025

(54) QUANTITATIVE MEASUREMENT OF AIR TURBULENCE

(71) Applicant: The Boeing Company, Chicago, IL (US)

(72) Inventors: Bhanu Pratap Singh Thakur, Himachal Pradesh (IN); Tim W. Anstey, Seattle, WA (US); Ameya Deepak Kamat, Maharashtra (IN)

(73) Assignee: The Boeing Company, Arlington, VA (US)

( * ) Notice: Subject to any disclaimer, the term of this patent is extended or adjusted under 35 U.S.C. 154(b) by 665 days.

(21) Appl. No.: 17/519,464

(22) Filed: Nov. 4, 2021

(65) Prior Publication Data

US 2022/0267024 A1    Aug. 25, 2022

Related U.S. Application Data

(60) Provisional application No. 63/153,246, filed on Feb. 24, 2021.

(51) Int. Cl.
*B64D 45/00* (2006.01)
*G08G 5/76* (2025.01)

(52) U.S. Cl.
CPC ............. *B64D 45/00* (2013.01); *G08G 5/76* (2025.01); *B64D 2045/0085* (2013.01)

(58) Field of Classification Search
None
See application file for complete search history.

(56) References Cited

U.S. PATENT DOCUMENTS

| | | | | |
|---|---|---|---|---|
| 2010/0315265 A1* | 12/2010 | Smith | .................. | G08G 5/0013 340/963 |
| 2016/0133137 A1* | 5/2016 | Rencher | ............... | G08G 5/0021 701/537 |
| 2019/0056862 A1* | 2/2019 | Gilbert | ...................... | G06F 3/01 |
| 2021/0063429 A1* | 3/2021 | Tucker | ................. | G08G 5/0047 |

* cited by examiner

*Primary Examiner* — Raymond L Nimox
(74) *Attorney, Agent, or Firm* — Alleman Hall & Tuttle LLP

(57) ABSTRACT

Examples provide a method and system for quantitatively measuring air turbulence. A turbulence measuring application on each user device in a plurality of user devices associated with a plurality of users at a plurality of different locations within an aircraft generates vibration data and positional data associated with turbulence detected at each user's location. The data is analyzed to eliminate noise due to user movements and other non-turbulence related events. An aircraft server aggregates the vibration data and the positional data generated by the user devices scattered throughout the aircraft. The aggregated data is analyzed to eliminate noise due to non-turbulence related events to create quantitative air turbulence data. The quantitative air turbulence data generated by one or more aircraft is used with weather and other related data to generate more accurate and precise turbulence predictions for aircraft.

20 Claims, 15 Drawing Sheets

QUANTITATIVE MEASUREMENT OF AIR TURBULENCE

CROSS-REFERENCE TO RELATED APPLICATION

This application claims the benefit of and priority to U.S. Provisional Application No. 63/153,246, entitled "QUANTITATIVE MEASUREMENT OF AIR TURBULENCE", filed Feb. 24, 2021, which is incorporated by reference herein in its entirety.

BACKGROUND

Turbulence is a type of in-flight vibration which causes aerodynamic excitation. The ability of the pilot to avoid pockets of air turbulence during flight can improve flight safety and comfort for passenger and crew, while avoiding flight delays, rerouting of flights, flight disruptions and/or possible equipment damage. It is generally recommended that turbulence detection include recommended greater than 0:8 probability of moderate-or-greater (MOG) turbulence detection and greater than 0:85 probability of null turbulence detection. Current systems typically detect turbulence based on pilot reports, weather reports and other qualitative data. Systems that depend on pilot reports to forecast air turbulence utilize qualitative classifications, such as, "light", "moderate", "severe" and "extreme". These qualitative measurements can be vague and may vary based on the user, resulting in inaccurate turbulence predictions due to the lack of more precise quantitative data.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Some aspects and implementations disclosed herein are directed at generating quantitative measurements of air turbulence associated with aircraft. An implementation includes a plurality of user devices associated with a plurality of users at a plurality of different locations within an aircraft. A turbulence measuring application is downloaded onto each user device. One or more of the turbulence measuring applications generates vibration data and positional data associated with the location of the user device generating the vibration data. An aircraft server receives and aggregates the vibration data and the positional data generated by each user device. The aggregated data is analyzed to eliminate noise associated with non-turbulence related vibrations to generate quantitative turbulence data. A turbulence prediction is generated based on the quantitative turbulence data obtained from one or more aircraft.

The features, functions, and advantages that have been discussed are achieved independently in various implementations or are to be combined in yet other implementations, further details of which are seen with reference to the following description and drawings.

BRIEF DESCRIPTION OF THE DRAWINGS

Corresponding reference characters indicate corresponding parts throughout the drawings.

DETAILED DESCRIPTION

Figure 1:
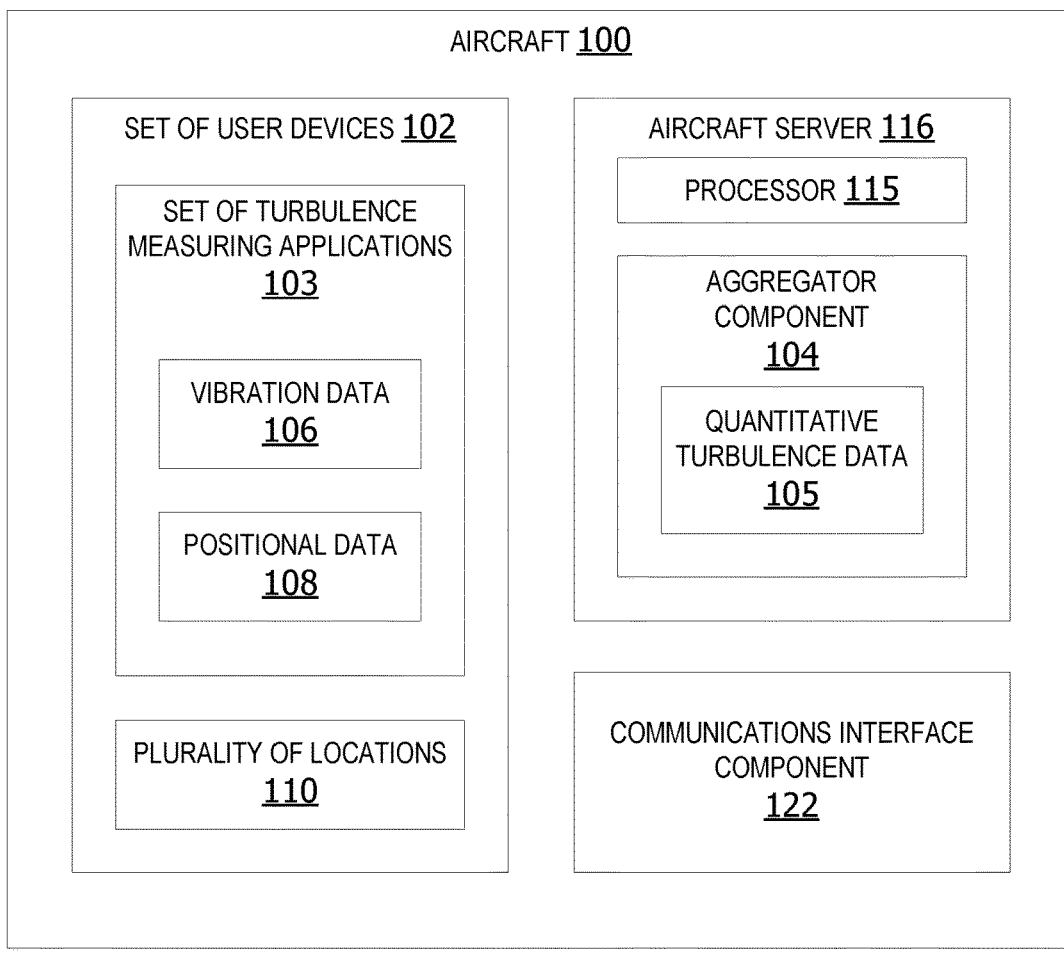
FIG. 1 is an exemplary block diagram illustrating an aircraft including a set of user devices and an aggregator component for generating quantitative turbulence data.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

Air Turbulence is a type of in-flight vibration which causes aerodynamic excitation. In some cases, this vibration can result in damage to equipment or injury. Aircraft sensor data can be used to generate eddy dissipation rate metrics measuring some turbulence. This input is fed to the graphical turbulence guidance (GTG) system. The GTG accepts inputs from the Pilot Reports, National Weather Service, and/or data from the National Lighting Detection Network.

Pilot reports provide qualitative data associated with turbulence encountered during flight from pilots. However, this information is subjective and sometimes inaccurate. Moreover, pilot reports are limited to vibrations experienced by pilots in the cockpit without regard for vibrations or other events occurring elsewhere in the aircraft. Therefore, turbulence predictions relying on qualitative data may be inaccurate and fail to meet goals. Inconsistencies in the reporting of the value of turbulence experienced by the pilots as part of the pilot reports may result in inaccuracies in the prediction of turbulence using modern GTG systems.

In-situ data generated on aircraft, such as by aircraft sensors, can be used to derive the eddy dissipation rates. This flight software is certified for a particular platform. Even though the capture of in-situ data is able to capture some quantitative data, there is no scale transformation to quantitatively compare the value measured by sensors and that experienced by the pilot (as captured in his pilot report). There are instances where the pilot report and in-situ application measure differing values of data. The pilot reports are only based on pilot experiences while seated in the cockpit. No inputs are considered from either passengers or cabin crew which might account for the variation between the intensity reported by the pilot reports and in-situ software.

Some examples provide a turbulence measuring application that can be either downloaded on to crew personal electronic devices, passenger personal electronic devices or a specialized hardware with sensors to measure in-flight vibration provided to the crew during boarding for the duration of the flight. The pilot, cabin crew and even passengers are be able to download the vibrations they experience at their different positions within the aircraft. The software records the turbulence, resolves it along the axis and determines the eddy dissipation rate. This is communicated over to the aircraft server which stores and periodically transfers this information to the GTG system for analysis and turbulence prediction.

The quantitative turbulence data measurements generated by the aggregator component are independent of aircraft sensor values. The same device can be used independent of the platform. In other words, the system is interoperable and may be used on any aircraft computing system platform. The same device can be used regardless of the particular system platform. This improves versatility and compatibility of the system.

Moreover, there are no certification costs involved as the turbulence measuring application is operable on user devices, rather than as flight software. This enables affordability, versatility, and scalability for the system.

The user devices measuring turbulence, in some examples, are spread across the aircraft (with pilots, crew and passengers), such that the values generated based on data generated by the user devices are not subject to position errors encountered from pilot reports. This enables reduced processor load on the aircraft processor, as well as improved reliability and accuracy of turbulence data.

The aggregator component inside the aircraft collates time stamped per-device turbulence data received from all the user devices in real-time. The aggregator component generates an aggregated final bundle of quantitative data measuring turbulence for the aircraft. This quantitative turbulence data is transmitted via communications system to a ground station. This provides reduced bandwidth usage and improves quality and accuracy of turbulence data for each aircraft.

The aggregator component in other examples processes the information from the various devices and generates the eddy dissipation rate for the entire aircraft. The software application eliminates human interference and calculations performed using the per-device data provides the eddy dissipation rate experienced at each user's location within the aircraft cabin. This provides more robust turbulence-related data while minimizing processor load on the aircraft server.

In other examples, an aircraft transmits turbulence data with one or more other aircraft. The turbulence data is shared between aircraft for improved accuracy of turbulence calculation. The shared turbulence data enables improved detection of turbulence and faster response time to turbulence occurring in real-time for improved safety.

In other examples, each turbulence measuring application on each user device self-calibrates for orientation of the device with respect to aircraft axis. The application automatically determines the threshold at which to begin recording and transmitting turbulence data rather than continuing to record all the time. This reduces battery power usage and data storage usage.

The system, in still other examples, enables the pilot, crew and passengers to measure the value of turbulence they experience using a software application within the personalized electronic device to provide a more quantitative measure of the turbulence. The measurement data, coupled with other in-situ air turbulence data gathered by other software applications, when fed as input to the GTG system, improves the forecasting ability of the system. The software records the turbulence, resolves it along the axis and determines the eddy dissipation rate. This is communicated over to the aircraft server which stores and periodically transfers this information to the GTG system.

Referring more particularly to the drawings, FIG. 1 provides is an exemplary block diagram illustrating an aircraft 100 including a set of one or more user devices 102 and an aggregator component 104 for generating quantitative turbulence data 105. A user device in the set of user devices 102 can include any device executing computer-executable instructions. The user device can be implemented as a mobile computing device, such as, but not limited to, a wearable computing device, a mobile telephone, laptop, tablet, computing pad, netbook, gaming device, and/or any other portable device. The user device may include at least one processor and a memory. The user device can also include a user interface component.

A user associated with the user device, in some examples, can include a passenger on the aircraft 100, a member of the crew of the aircraft 100 or a pilot or other personnel on the aircraft. The user opts-in or otherwise chooses to download a turbulence measuring application onto the user device associated with the user, such as, but not limited to, an application in a set of one or more turbulence measuring applications 103.

The set of turbulence measuring applications 103, in some examples, is a set of one or more applications downloaded onto one or more user devices within the set of user devices 102 associated with one or more aircraft. A turbulence measuring application 103 measures vibrations, such as in-flight vibration, experienced by a device on an aircraft. As used herein, the term vibration can refer to any type of movements, such as shaking, bouncing, vibrations, gyrating, lifting, falling, side-to-side motions, up-and-down motions or other excitation of the user device running or hosting the application.

In some examples, a threshold value is utilized by the user device to determine whether to generate or record vibration data. In an example, if the vibrations detected by the turbulence measuring application on the user device exceed a predetermined threshold, the turbulence measuring application generates vibration data 106 recording information associated with the movements. If the vibrations do not exceed the threshold strength level or the threshold duration level the detected vibrations are not recorded or otherwise remain unrecorded by the application. This reduces processor load, power usage and network usage by each individual user device.

The vibration data 106 includes data such as, but not limited to, time the vibration occurred, strength of the vibration or other movement, direction of the movement along an axis, orientation, angular velocity, etc. Movement along an axis includes movement along an x-axis, y-axis and/or z-axis in three-dimensional space. The vibration data, in other examples, also include the duration of each movement and/or duration of all the movements or vibrations detected.

The set of user devices 102, in some examples, include a personal mobile computing device belonging to a user. In other examples, a user device may be a mobile computing device issued or otherwise loaned to a passenger or crew member for temporary usage during a flight.

In still other examples, the set of user devices 102 includes one or more user devices mounted to a seat back or other fixture of the aircraft. A mounted user device remains in a fixed position within the aircraft during flight, whereas a non-mounted, mobile user device is able to be carried or transported throughout the aircraft by a user and may therefore change position or location within the aircraft during flight.

Positional data 108 is data generated by the turbulence measuring application on a given user device. The positional data 108 indicates the relative location, position and/or orientation of a non-mounted user device within the aircraft at the time a given portion of the vibration data 106 is generated or other motion is otherwise measured.

Each user device in the set of user devices includes a set of sensor devices within the user device for measuring vibrations and other movements. A device in the set of sensor devices can include a gyroscope, accelerometer, magnetometer, global positioning satellite (GPS) system, barometer, proximity sensor, ambient light sensor, or any other type of sensor devices for measuring motion, location, movement, etc.

The aircraft 100 optionally includes a set of fixed or otherwise stationary aircraft sensor devices 112. These sensors can include, without limitation, GPS sensors, barometers, gyroscopes, or any other type of sensors for measuring speed, movement, orientation, etc. The sensor devices 112 transmit sensor data 114 associated with movement and/or turbulence to the aircraft server 116.

The aircraft server 116 is a computing device for receiving, collating, timestamping, and aggregating vibration data 106 and/or positional data 108 received from the set of user devices 102. The aircraft server 116 represents any device executing computer-executable instructions (e.g., as application programs, operating system functionality, or both) to implement the operations and functionality associated with the server. The aircraft server 116, in some examples, includes a processor 115 and a memory (not shown).

In the illustrated example, the aircraft server 116 is onboard the aircraft 100, but in other examples the aircraft server 116 may be offboard (e.g., ground based) the aircraft 100.

In some non-limiting examples, the aircraft server may be implemented as a cloud server. A cloud server is a logical server providing services to a computing device or other clients. The cloud server is hosted and/or delivered via the network. In some non-limiting examples, the cloud server is associated with one or more physical servers in one or more data centers. In other examples, the cloud server is associated with a distributed network of servers.

The aircraft server 116, in some examples, includes an aggregator component 104 that analyzes the data from the data from the set of user devices 102, such as the vibration data 106 and the positional data 108, as well as the sensor data 114 to generate quantitative turbulence data 105. The quantitative turbulence data 105 provides a quantitative turbulence value indicating a degree or severity of actual air turbulence experienced or otherwise encountered by the aircraft. The aggregator component 104, in other examples, analyzes the vibration data, positional data and sensor data 114 to remove noise due to non-turbulence related events (e.g., user movement, such as walking around the aircraft or transitioning between sitting and standing). Noise can occur due to shifting inanimate objects, a user moving or walking, etc.

In some examples, the aircraft 100 optionally includes a communications interface component 122. The communications interface component 122 includes a network interface card and/or computer-executable instructions (e.g., a driver) for operating the network interface card. Communication between the aircraft server 116 and the set of user devices 102 can occur using any protocol or mechanism over any wired or wireless connection. In some examples, the communications interface component 122 is operable with short range communication technologies, such as by using near-field communication (NFC) tags. In still other examples, the communication interface component 122 enables the aircraft 100 to transmit the quantitative turbulence data 105 to a remote computing device, such as a server at a data center or other ground station.

In other examples, the aircraft 100 transmits and receives data from one or more other aircraft. In one example, the aircraft 100 transmits quantitative turbulence data to one or more other aircraft. In other examples, the aircraft receives turbulence data from one or more other aircraft. The turbulence data, in non-limiting examples, is used to further refine identification of turbulence as well as improved navigation to avoid turbulence during flight. The communications of data between aircraft may also be used to train machine learning on aircraft for improved filtering and analysis of vibration data during flight.

Figure 2:
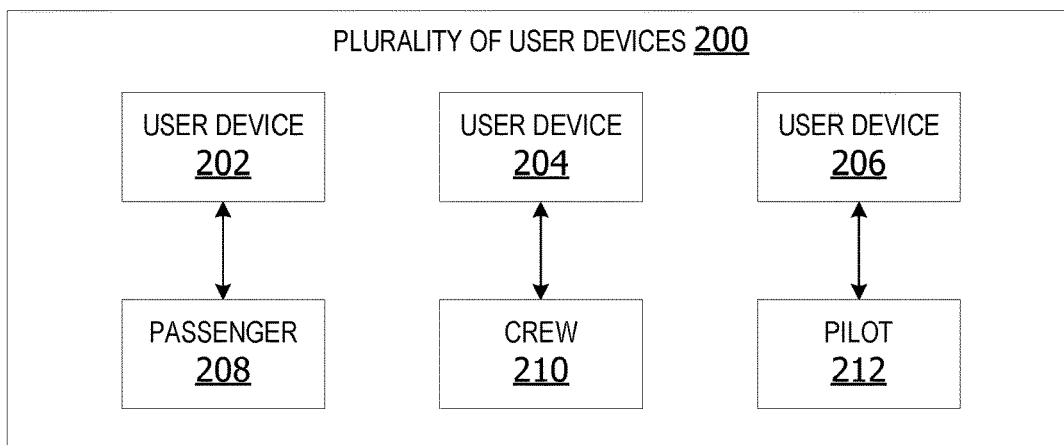
FIG. 2 is an exemplary block diagram illustrating a plurality of user devices associated with an aircraft.

FIG. 2 is an exemplary block diagram illustrating a plurality of user devices associated with an aircraft, such as, but not limited to, the aircraft 100 in FIG. 1. The plurality of user devices 200 includes one or more user devices, such as, but not limited to, the set of user devices 102 in FIG. 1. A user device in the plurality of user devices 200 can include, for example but without limitation, a cellular telephone, a tablet, a smart watch, a laptop computer, or any other type of mobile computing device. In other examples, the plurality of user devices may also include one or more mounted devices, such as a tablet or other user device mounted into a seat back.

Each user device in the plurality of user devices 200, in other examples, is associated with a user. The user can be a passenger, crew member, pilot, security personnel, or any other person on the aircraft. In this non-limiting example, a user device 202 is associated with a passenger 208, a user device 204 is associated with a crew 210 member, and a user device 206 is associated with a pilot 212.

The plurality of user devices 200, in this non-limiting example, includes three user devices. However, the examples are not limited to three user devices. The plurality of user devices can include two user devices, as well as four or more user devices. In some examples, the system includes dozens or even hundreds of user devices generating vibration data and/or positional data used to create quantitative turbulence data in real-time as an aircraft is in-flight.

Figure 3:
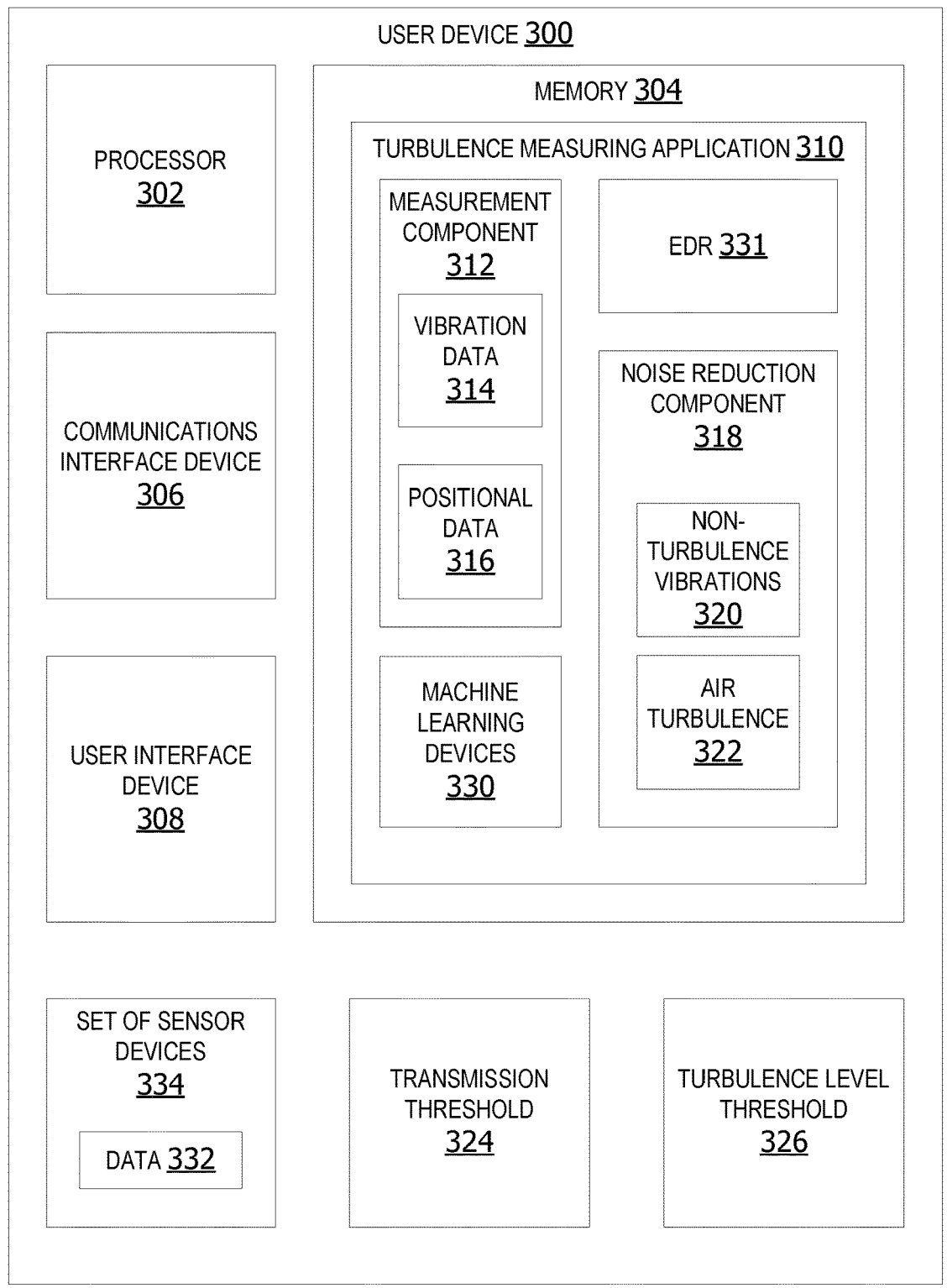
FIG. 3 is an exemplary block diagram illustrating a user device in set of user devices associated with an aircraft.

FIG. 3 is an exemplary block diagram illustrating a user device 300 in the set of user devices 200 associated with an aircraft, such as, but not limited to, the aircraft 100 in FIG. 1. The user device 300 represents any device executing computer-executable instructions (e.g., as application programs, operating system functionality, or both) to implement the operations and functionality associated with the user device 300. The user device 300, in some examples, includes a mobile computing device or any other portable device. A mobile computing device may be implemented as a device such as, for example but without limitation, a mobile telephone, laptop, tablet, computing pad, netbook, gaming device, and/or portable media player. Additionally, the user device 300 can represent a group of processing units or other computing devices.

In some examples, the user device 300 has at least one processor 302 and a memory 304. The user device 300 in other examples includes a user interface device 308. The processor 302 includes any quantity of processing units and is programmed to execute the computer-executable instructions. In some examples, the processor 302 is programmed to execute instructions such as those illustrated in the figures (e.g., FIG. 9, FIG. 10, FIG. 11, and FIG. 12).

The memory 304 includes any quantity of media associated with or accessible by the user device 300. The memory 304 stores data and/or applications, such as, but not limited to, the turbulence measuring application 310. The applications, when executed by the processor 302, operate to perform functionality on the user device 300. The applications can communicate with counterpart applications or services such as web services accessible via a network. In an example, the applications, including the turbulence measuring application 310, represent downloaded client-side applications that correspond to server-side services executing in a cloud.

In other examples, the user interface device 308 includes a graphics card for displaying data to the user and receiving data from the user. The user interface component can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component can also include one or more of the following to provide data to the user or receive data from the user: speakers, a sound card, a camera, a microphone, a vibration motor, one or more accelerometers, a BLUETOOTH® brand communication module, global positioning system (GPS) hardware, an automatic dependent surveillance broadcast (ADS-B) reader, and/or a photoreceptive light sensor. In some examples, a GPS signal may not be accessible to the device. In a non-limiting example, the user inputs commands or manipulates data by moving the user device 300 in one or more ways.

The turbulence measuring application 310, in some examples, includes a measurement component 312 which analyzes data 332 generated by a set of one or more sensor devices 334 on the user device 300. The set of sensor devices may include any type of devices for measuring or detecting vibrations or other change in location and/or direction of movement, such as, but not limited to, a gyroscope, GPS, magnetometer, accelerometer, barometer, and/or any other sensor devices. The measurement component 312 determines whether the vibrations registered by the sensor devices is equal to or greater than a turbulence level threshold 326 value.

The turbulence level threshold 326 is a predetermined value or user-configured value for triggering recording of vibration data. This ensures that every small movement of the user device does not result in recording of vibration data. The threshold reduces or otherwise minimizes processor usage, memory usage, processor load, network usage and other resource usage on the user device. This further reduces battery and other power usage by the user device 300.

If the level of vibration detected meets or exceeds the turbulence level threshold 326, the user device 300 records the vibrations in the form of vibration data 314 and/or positional data 316 indicating the location and/or position and orientation of the user device 300 at the time of the occurrence of the detected vibration. The vibration data is data such as, but not limited to, the vibration data 106 in FIG. 1. The positional data 316 includes data such as, but not limited to, the positional data 108 in FIG. 1.

In some examples, a noise reduction component 318 analyzes the vibration data and positional data to determine whether the vibrations are non-turbulence vibrations 320 or actual air turbulence 322. Non-turbulence vibrations 320 are vibrations occurring due to events other than actual air turbulence on the aircraft. Examples of non-turbulence vibrations, or non-turbulence-related activity, may be human or user activity, such as moving within the aircraft. Identification of non-turbulence vibrations can include human activity recognition. In other words, the noise reduction component can include a human activity recognition component for analyzing vibration data and positional data to identify data patterns indicating human activity rather than turbulence.

Human activity recognition monitors and analyzes generated data to eliminate noise due to non-turbulence related activity. The noise generated due to non-turbulence related human activity can include a user kicking the back of a seat, a user device placed inside a pocket or bag, a user playing a video game on the user device, etc. Noise related to human activity is recognized and eliminated for more accurate identification of turbulence.

Examples of non-turbulence vibrations 320 can include movements due to shifting cargo, a cart rolling along the floor, sound or audio vibrations from a speaker, or any other non-turbulence related events. Non-turbulence vibrations 320 can include movements of the user device due to human activity, such as, but not limited to, a user holding a user device walking, a user dropping the user device, a user moving the user device voluntarily while utilizing the user device, etc. Additional examples of non-turbulence vibrations 320 due to human activity can include, without limitation, a user shifting in their seat, someone kicking the back of a seat, someone walking, clapping, talking, a user adjusting their seat, etc.

A machine learning component 330, in some examples, analyzes vibration data, noise reduction data, training data and/or user feedback to learn to discern between actual air turbulence and non-turbulence vibrations 320. The machine learning component 330 utilizes artificial intelligence and pattern recognition to determine when detected vibrations are due to air turbulence or other non-turbulence related events. The machine learning component 330 is capable of improving recognition of actual air turbulence based on patterns of user movements, patterns of vibrations normally occurring on the aircraft, user feedback, training data including examples of air turbulence related event data and non-turbulence vibrations data, etc. The machine learning component may include pattern recognition, modeling, or other machine learning algorithms to analyze sensor data and/or turbulence data to determine when to record data and/or when to transmit data to the aircraft server.

The turbulence measuring application 310 transmits the noise-filtered vibration data and positional data to an aggregator component for further analysis. In some examples, the data is transmitted at a regular, pre-determined frequency provided in a transmission threshold 324. In other examples, the data is transmitted continuously. This continuous data transmission enables the system to identify gradual trends as opposed to periodic to avoid moving averages. This ensures the system computes gust trends in the vicinity of the aircraft for future turbulence trend predictions.

In one example, the frequency for transmission of vibration data to the aggregator is one minute. In another example, the frequency for transmission is thirty seconds. In still another example, the frequency is two minutes. If the duration of time since the last transmission of vibration data is equal to or exceeds the transmission threshold 324 value, the communications interface device 306 transmits the data to the aggregator component for utilization in generating quantitative turbulence data for the aircraft, such as, but not limited to, the aggregator component 104 in FIG. 1.

The user device 300 in other examples optionally includes a data storage device for storing per-device turbulence data, including vibration data and/or positional data, prior to transmission to the aircraft server. The data storage device may include one or more different types of data storage devices, such as, for example, one or more rotating disks drives, one or more solid state drives (SSDs), and/or any other type of data storage device. The data storage device in some non-limiting examples includes a redundant array of independent disks (RAID) array. In other examples, the data storage device includes a database.

The data storage device may be included within the user device, be attached to the user device, or plugged into the user device, such as via a universal serial bus (USB) port. In In other examples, the data may be stored in a remote data storage accessed by the user device via a network, such as a cloud storage.

In some examples, the per-device turbulence data generated by the measurement component 312 includes an eddy dissipation rate (EDR) 331. The EDR 331 is a metric for measuring turbulence.

In this example, the raw vibration data and positional data is analyzed and filtered on the user device 300 to generate per-device turbulence data. In other examples, the raw vibration data is transmitted to the aircraft server for analysis and filtering. In other words, in these examples, the user device only generates the sensor data associated with vibrations and positional data where the vibrations were detected. There is no filtering out noise, analyzing, or eliminating non-air turbulence related events. All this analysis is performed on the aircraft server during aggregation.

Figure 4:
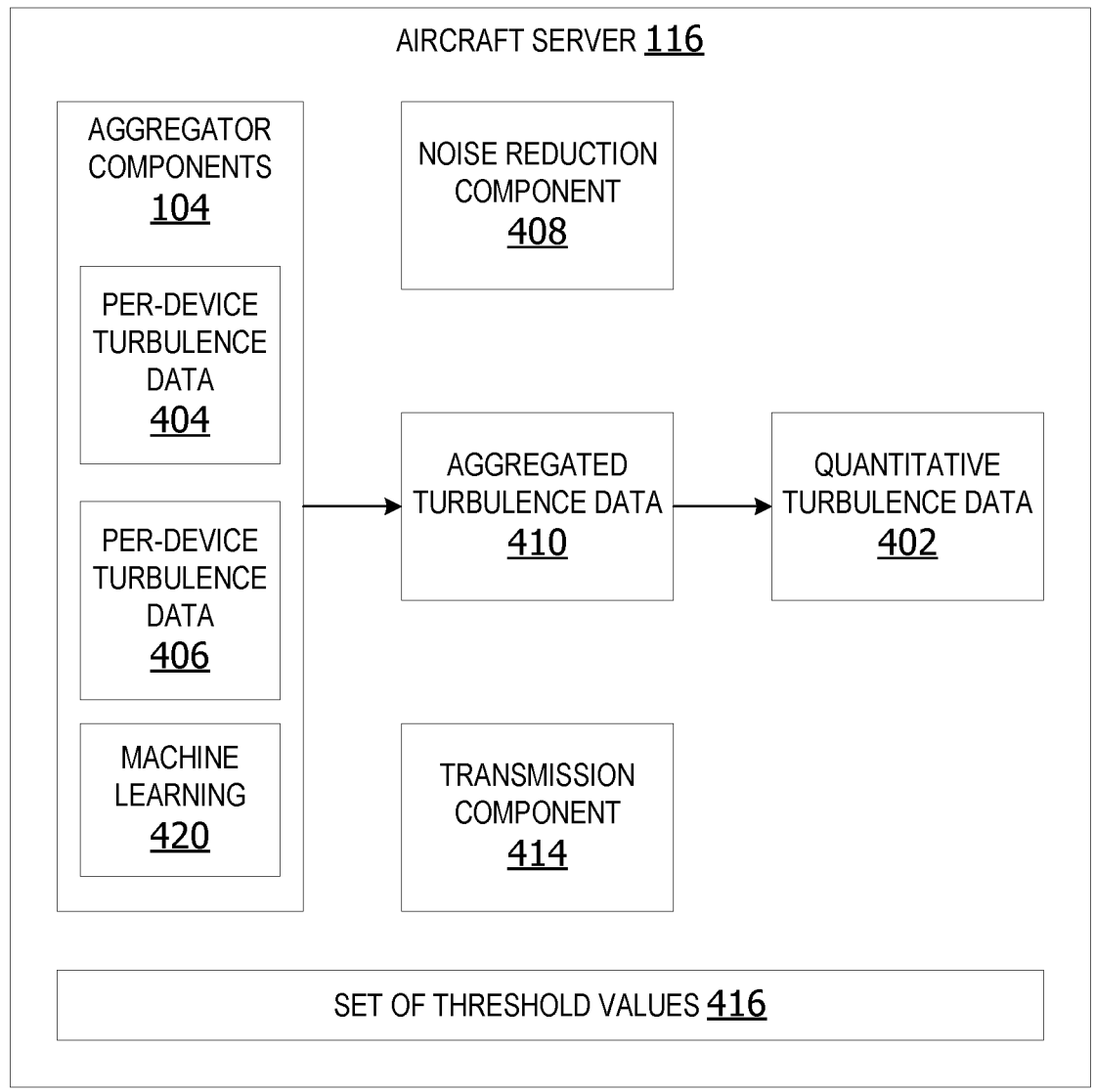
FIG. 4 is an exemplary block diagram illustrating an aircraft server having an aggregator component generating quantitative turbulence data.

FIG. 4 is an exemplary block diagram illustrating an aircraft server 116 having an aggregator component 104 generating quantitative turbulence data 402. The aggregator component 104 receives data from each user device in the set of user devices hosting turbulence measuring applications on the aircraft. In this non-limiting example, the aggregator component 104 receives per-device turbulence data 404 from a first user device at a first location on the aircraft and per-device turbulence data 406 from a second user device located in a second location on the aircraft. The per-device turbulence data includes vibration data and positional data, such as, but not limited to, the vibration data 106 and the positional data 108 in FIG. 1. The per-device turbulence data from two or more devices is collated, time-stamped and analyzed to create aggregated turbulence data 410.

The aggregated turbulence data 410 is filtered by a noise reduction component 408 to create quantitative turbulence data 402 quantitatively measuring air turbulence on the aircraft during a specific time-period and/or at an identified location. In some examples, the noise reduction component 408 analyzes the per-device turbulence data received from all the user devices within a given time-period to remove non-turbulence related vibration data. In other words, the noise reduction component filters the data to eliminate any vibration data which is not likely to be due to air turbulence on the aircraft.

In some examples, a machine learning 420 utilizes pattern recognition and artificial intelligence to identify vibrations which are due to air turbulence and vibrations measured by user devices which is most likely due to user actions or other non-turbulence related causes. The machine learning 420, in some examples, receives training data including examples of sensor data generated during air turbulence and sensor data generated by user devices during non-turbulence related events to assist the machine learning in distinguishing between these differing events. The machine learning may receive user feedback as well to assist with improving air turbulence data recognition.

A transmission component 414, in some examples, transmits the quantitative turbulence data 402 to a prediction component at an occurrence of a predetermined event, such as, but not limited to, a predetermined frequency or time-interval. In other examples, a set of threshold values 416 provides a threshold frequency value. When the time-interval since transmission of quantitative turbulence data to a ground station for additional analysis and/or turbulence prediction generation. The transmission component 414 can include a communications interface device for connecting to a network to transmit the data.

Figure 5:
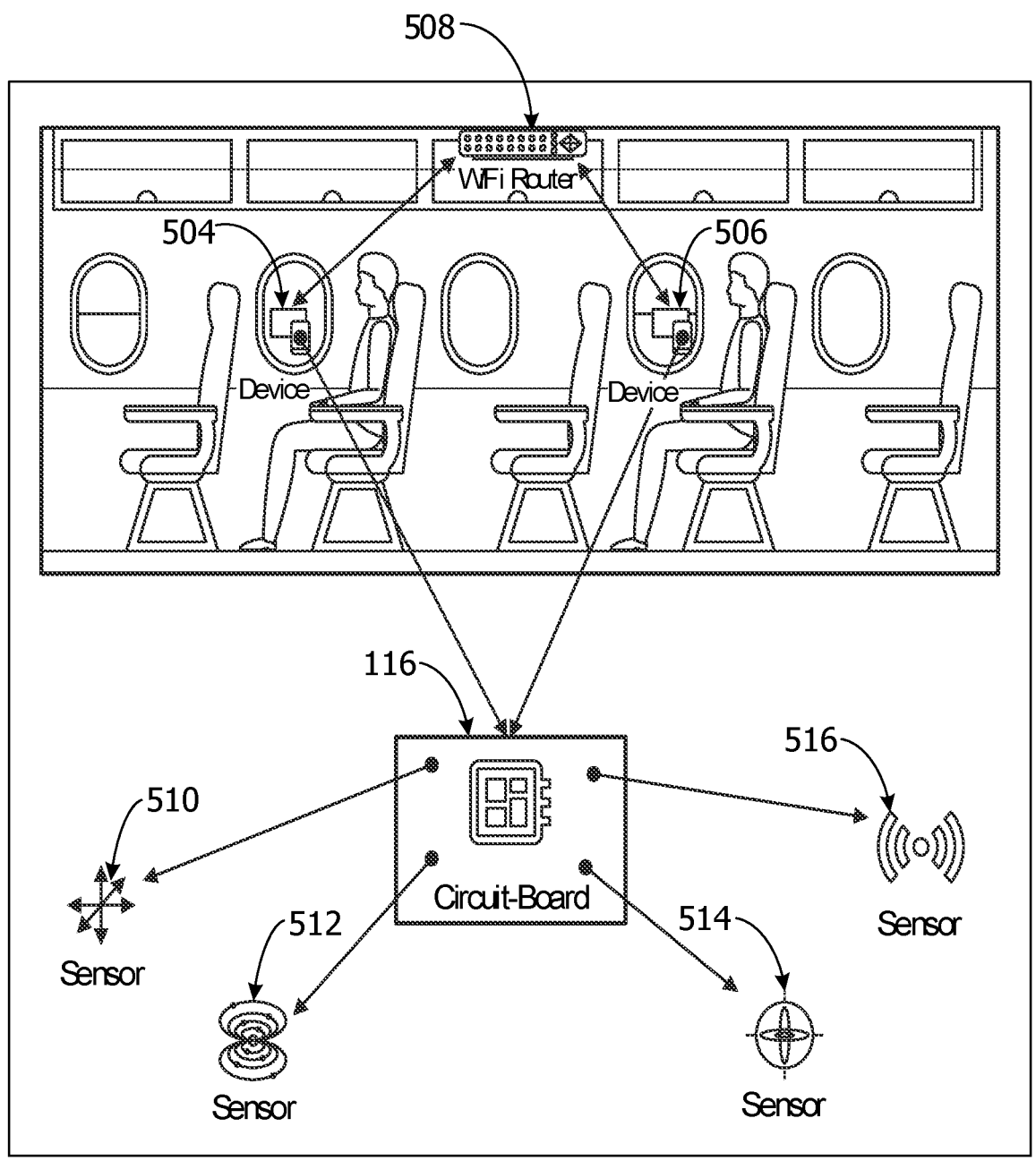
FIG. 5 is an exemplary block diagram illustrating a set of user devices transmitting data to an aircraft server for generating quantitative turbulence data.

FIG. 5 is an exemplary block diagram illustrating a set of user devices transmitting data to an aircraft server 116 for generating quantitative turbulence data. The aircraft server 116 receives per-device turbulence data, including vibration data and positional data, from one or more user devices associated with one or more users within the aircraft. In this example, the server receives data from the user device 504 and the user device 506.

The per-device turbulence data is transmitted from the user devices to the aircraft server 116 via a network device, such as, but not limited to, a router 508. The router is a communications interface device, such as, but not limited to, the communications interface device 306 in FIG. 3.

The server 116 also receives sensor data from a set of sensor devices. In this example, the set of sensor devices includes a sensor 510, a sensor 512, a sensor 514 and a sensor 516 located at various different locations throughout the aircraft. The set of sensor devices transmitting sensor data to the aircraft server 116 is not limited to four sensor devices as shown in FIG. 5. In other examples, the set of sensor devices can include a single sensor, as well as two or more sensors.

Figure 6:
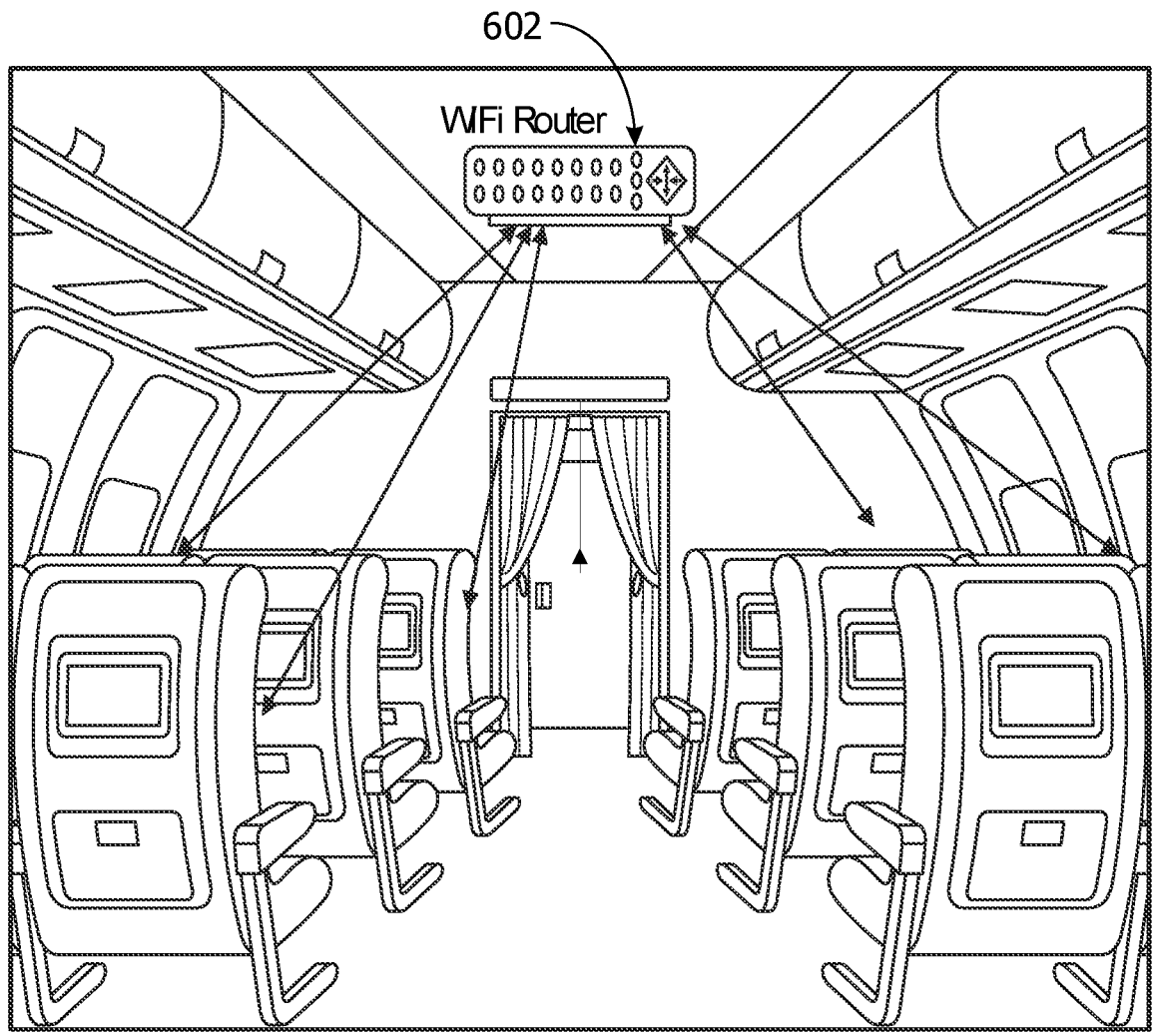
FIG. 6 is an exemplary block diagram illustrating a router receiving vibration data from a plurality of user devices.

FIG. 6 is an exemplary block diagram illustrating a router 602 receiving vibration data from a plurality of user devices. In this non-limiting example, the plurality of user devices within the aircraft transmitting per-device turbulence data to the aircraft server for analysis includes six user devices. However, the plurality of user devices is not limited to six user devices. The plurality of user devices can include two user devices, as well as three or more user devices. In some non-limiting examples, the plurality of user devices includes dozens or even hundreds of user devices.

In this example, the user devices are mounted into seat backs within the passenger compartment of the aircraft. In other examples, the plurality of user devices includes non-mounted, mobile devices, such as smart phones, smart watches, tablets, laptops, smart glasses, etc.

Figure 7:
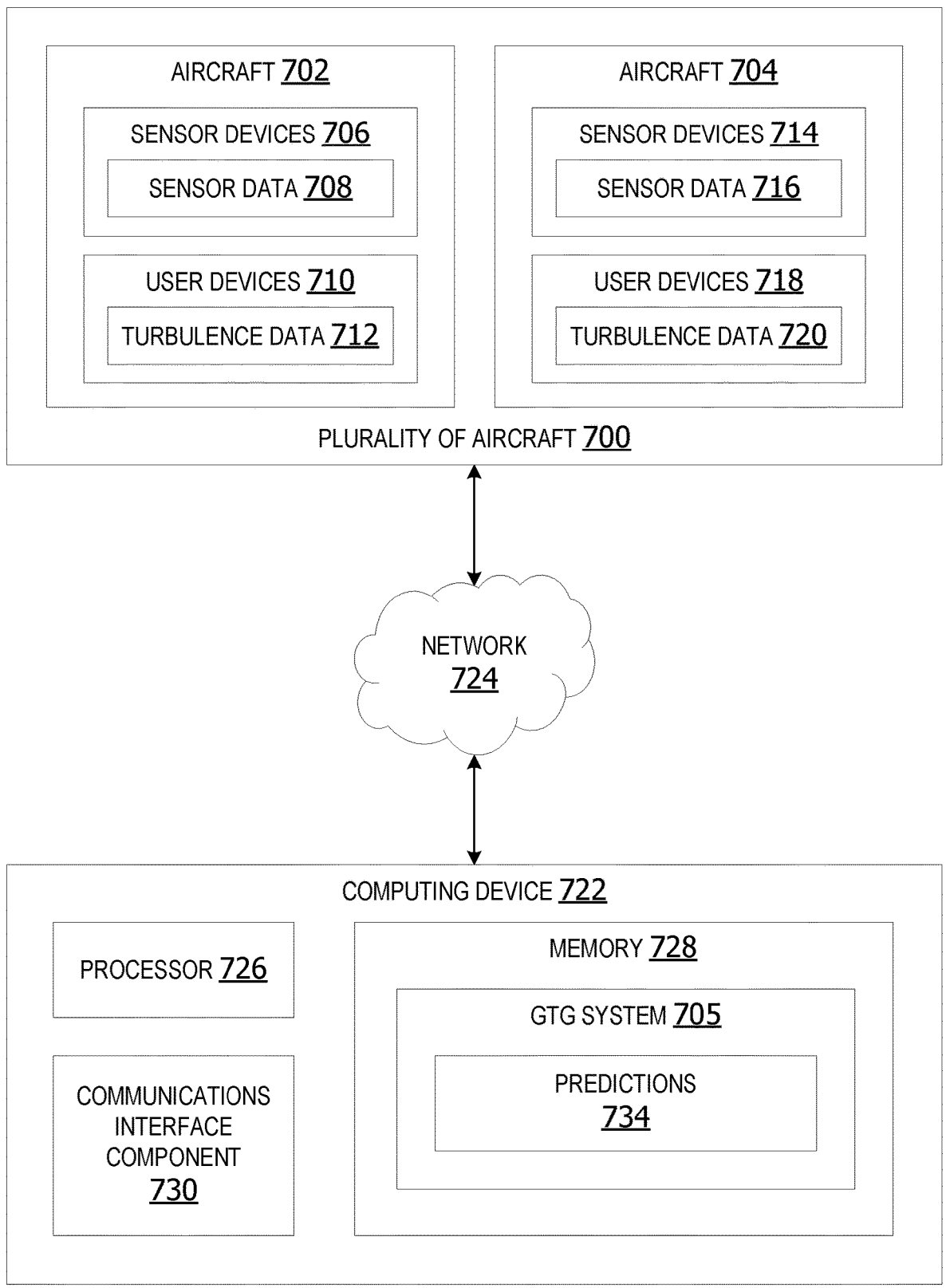
FIG. 7 is an exemplary block diagram illustrating a system for transmitting turbulence data from aircraft to a graphical turbulence guidance (GTG) system.

FIG. 7 is an exemplary block diagram illustrating a system for transmitting turbulence data 720 from aircraft to a GTG system. In this non-limiting example, a plurality of aircraft 700 includes a first aircraft 702 and a second aircraft 704 sending quantitative turbulence data 720 to a GTG system 705. However, the examples are not limited to two aircraft transmitting turbulence data 720. In other examples, plurality of aircraft transmitting quantitative turbulence data 720 to the GTG system for analysis may include three or more aircraft. In some examples, dozens of aircraft transmit turbulence data 720 to the GTG system for generating predictions of future turbulence.

The GTG system sends alerts or warnings to aircraft which may encounter predicted turbulence. The warnings may be displayed on the cockpit heads down system or another user interface device associated with the pilot. The turbulence predictions enable pilots to take corrective measures to avoid turbulence.

Air turbulence can be responsible for many weather-related commercial aircraft accidents, injuries, and equipment damage. The turbulence detection and prediction warnings sent to aircraft by the GTG system alert pilots to potential turbulence and take corrective action.

Each aircraft includes sensors and user devices for measuring turbulence. In this example, aircraft 702 includes a set of one or more sensor devices 706 generating sensor data 708 associated with vibrations in or on the aircraft. The sensor devices 706 in this example are stationary and located at various different locations inside and outside the aircraft.

The aircraft 702 includes one or more user devices 710 associated with one or more users inside the interior of the aircraft. The user devices 710 may be located inside the passenger compartment, the cockpit, crew areas, as well as any other areas inside the aircraft accessible to human users. The user devices 710 generate turbulence data 712. The turbulence data 720 includes positional data and vibration data generated by each individual user device. The user device(s) may include mobile devices, as well as devices mounted into passenger seat backs.

The second aircraft 704 includes a set of one or more sensor devices 714 generating sensor data 716. One or more user devices 718 running the turbulence measuring application 310 generates turbulence data 720 associated with the location of each individual user device inside the interior of the aircraft.

The plurality of aircraft 700 transmit the quantitative turbulence data 720 generated by each aircraft to a remote computing device 722 located on the ground via a network 724. The network 724 may be implemented as any type of network.

The network 724 is implemented by one or more physical network components, such as, but without limitation, routers, switches, network interface cards (NICs), and other network devices. The network 724 is any type of network for enabling communications with remote computing devices, such as, but not limited to, a local area network (LAN), a subnet, a wide area network (WAN), a wireless (Wi-Fi) network, or any other type of network. In this example, the network 724 is a WAN, such as the Internet. However, in other examples, the network 724 is a local or private LAN.

In still other examples, the network 724 is implemented via a satellite communications (SATCOM) systems, aircraft communications addressing and reporting system (ACARS) and/or future 5G ground based terrestrial towers.

The computing device 722 represents any type of computing device for analyzing turbulence data 720 and generating predictions 734. The computing device 722 includes at least one processor 726 and a memory 728. A GTG system analyzes the quantitative turbulence data 720 received from each aircraft along with weather data, qualitative pilot reports and/or any other related data available to the system. The GTG system generates predictions 734 of future turbulence based on the quantitative turbulence data 720.

In some examples, the computing device includes a communications interface component 730 for sending and receiving data via the network 724. The computing device receives quantitative turbulence data 720 from the aircraft via the communications interface component 730. The GTG system transmits predictions 734 to aircraft via the communications interface component 730.

Figure 8:
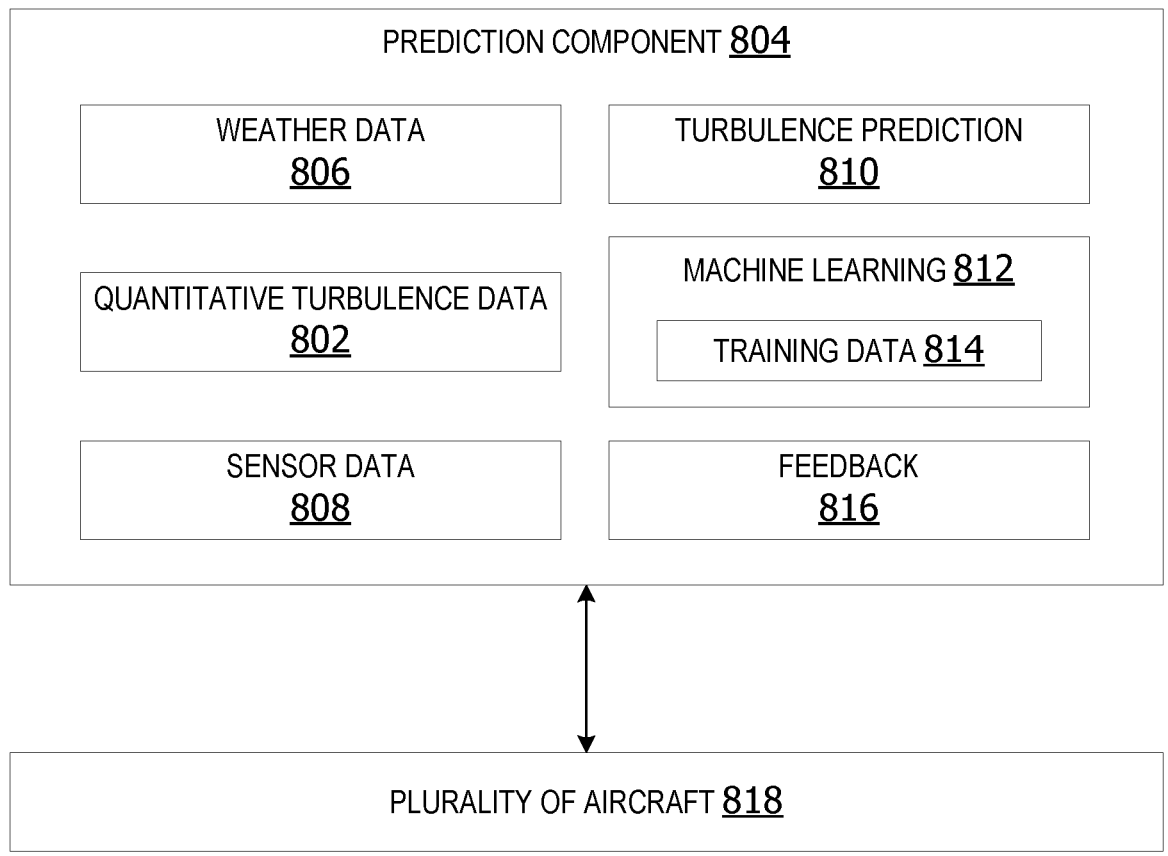
FIG. 8 is an exemplary block diagram illustrating a GTG system generating turbulence predictions based on quantitative turbulence data.

FIG. 8 is an exemplary block diagram illustrating a GTG system 705 generating turbulence predictions based on quantitative turbulence data 802 received from a set of aircraft 818. The set of aircraft 818 is a set of one or more aircraft, such as, but not limited to, the aircraft 100 in FIG. 1 or aircraft in the plurality of aircraft 700 in FIG. 7.

The prediction component 804 analyzes the quantitative turbulence data 802 received from one or more aircraft with other available data, such as weather data 806 and/or sensor data 808, to generate a turbulence prediction 810. There may also be refinement for sensors of a particular device in case a majority of other co-located devices provided a different reading. This is an additional feedback aspect for further refining quality of available data utilized to improve accuracy of the generated turbulence prediction.

The prediction component 804, in some examples, includes a machine learning 812 software component for generating the turbulence prediction 810. The machine learning 812 is trained using training data 814 and/or feedback 816 from users to refine turbulence predictions. For example, if the turbulence prediction 810 indicates turbulence is likely in an area where aircraft do not experience turbulence, the feedback 816 indicates the lack of turbulence. The feedback 816 is used to further refine future predictions of turbulence to improve the accuracy and reliability of the predictions.

In this example, the GTG system is associated with one or more physical devices at a ground station or data center. In other examples, the GTG system may be implemented on a cloud server.

Figure 9:
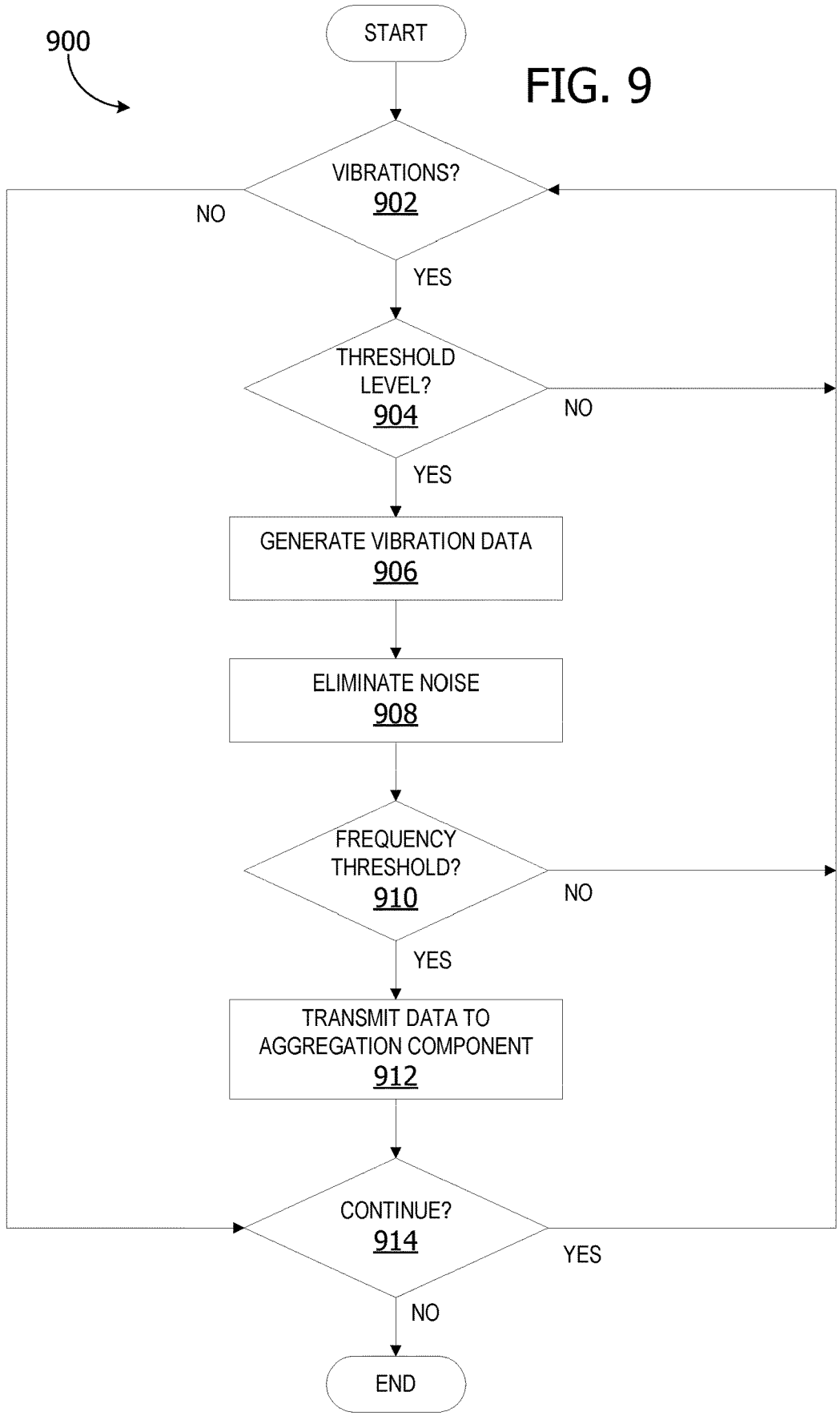
FIG. 9 is a flow chart illustrating an implementation of a turbulence measuring application on a user device generating of per-device turbulence data.

With reference now to FIG. 9, a flowchart 900 is shown illustrating an implementation of a turbulence measuring application 310 on a user device 300 generating of per-device turbulence data. In one implementation, the operations illustrated in FIG. 9 are performed, at least in part, by executing instructions by the one or more processors, such as, but not limited to, the processor 302.

Operation 902 includes a determination by a measurement component 312 whether vibrations are detected. Vibrations are detected based on sensor data generated by the sensor devices on the user device 300, such as, but not limited to, a motion sensor, a gyroscope, etc. If vibrations are detected, the measurement component 312 makes a determination as to whether the level, strength or type of vibrations reach a threshold level at operation 904. If the threshold level is reached, at operation 906 the measurement component 312 generates vibration data. A noise reduction component 318 analyzes the data to eliminate noise at operation 908. Noise includes motions or vibrations which occur as a result of events unrelated to air turbulence.

At operation 910, the measurement component 312 determines if the frequency threshold for transmitting turbulence data to the aircraft server is reached. If not, the measurement component 312 continues passive monitoring for vibrations. In some non-limiting examples, already generated turbulence data is stored on a data storage device on the user device 300 until the frequency threshold is reached. Once the frequency threshold is reached, the turbulence measuring application 310 transmits the turbulence data to the aggregator component 104 on the aircraft server at operation 912. A determination is made whether to continue at 914. If yes, operations 902 to 914 are iteratively executed until the decision is made not to continue.

Figure 10:
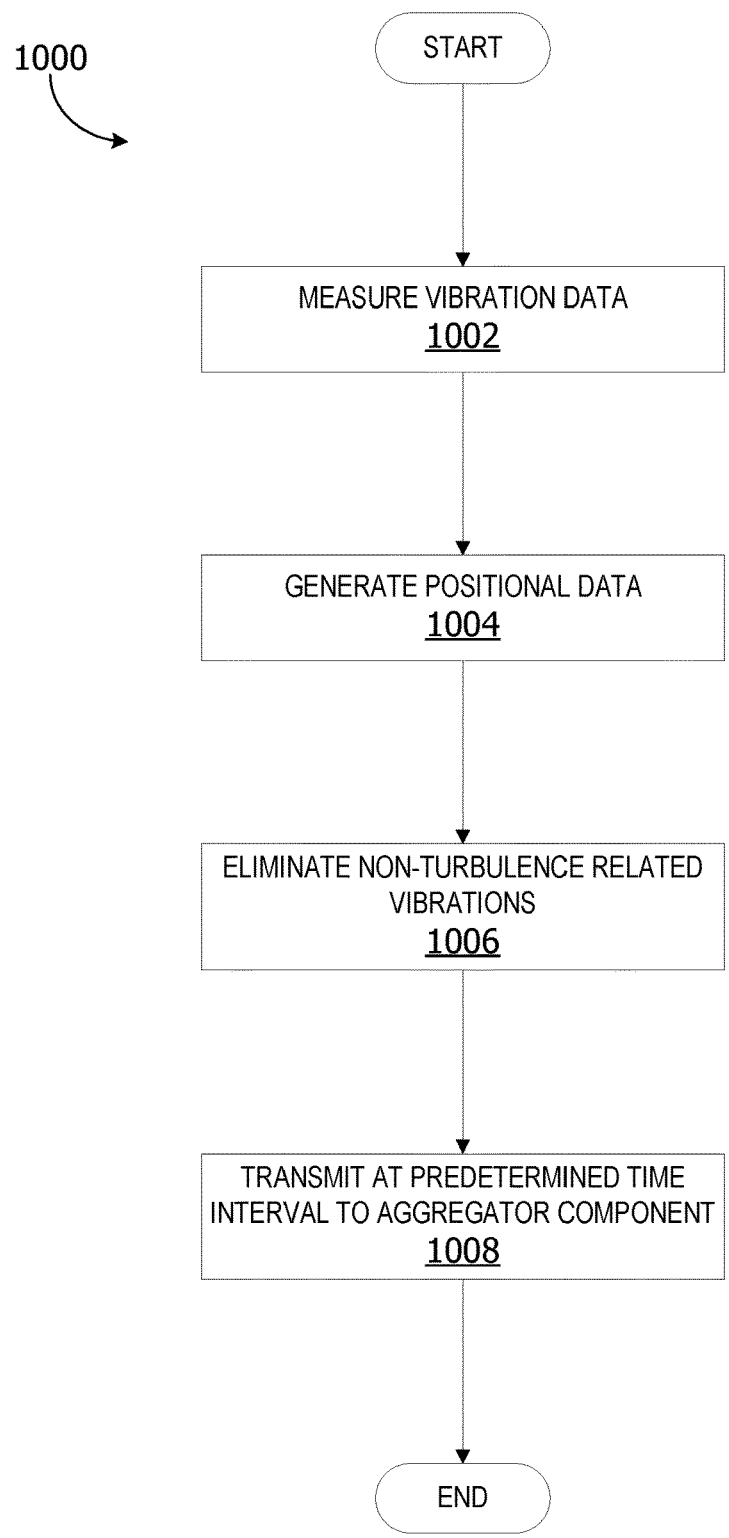
FIG. 10 is a flow chart illustrating an implementation of a user device 300 transmitting per-device turbulence data to an aggregator component.

FIG. 10 is a flow chart 1000 illustrating an implementation of a user device 300 transmitting per-device turbulence data to an aggregator component 104. In one implementation, the operations illustrated in FIG. 10 are performed, at least in part, by executing instructions by the one or more processors, such as, but not limited to, the processor 302.

At operation 1002, the measurement component 312 measures vibration data based on sensor data generated by sensor device(s) on the user device 300. At operation 1004, the measurement component 312 generates positional data identifying where the vibration was detected within the aircraft. The positional data may be generated using GPS sensors, motion sensors, etc. The noise reduction component 318 eliminates non-turbulence related vibrations from the data at 1006. The noise reduction filtering is accomplished by comparing the vibration data with examples of both turbulence related event data and non-turbulence related event data. The noise reduction filtering in other examples further includes utilization of machine learning to identify patterns in data indicating whether sensor data is associated with turbulence. The user device 300 transmits the per-device turbulence data to the aggregator component 104 at a predetermined time interval at operation 1008.

Figure 11:
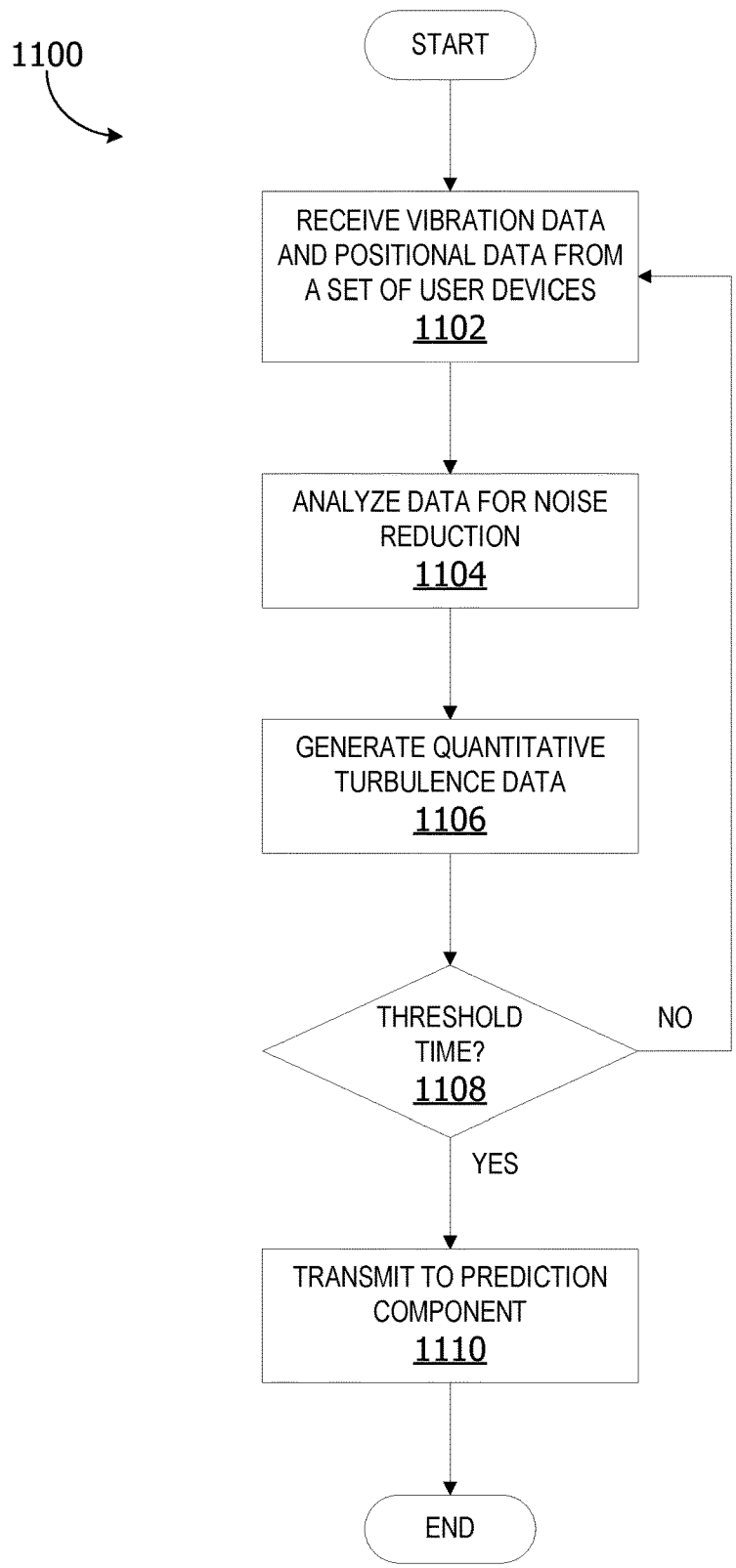
FIG. 11 is a flow chart illustrating an implementation of an aggregator component generating quantitative turbulence data.

FIG. 11 is a flow chart 1100 illustrating an implementation of an aggregator component generating quantitative turbulence data. In one implementation, the operations illustrated in FIG. 11 are performed, at least in part, by executing instructions by the one or more processors, such as, but not limited to, the processor 115. At operation 1102, the aggregator component 104 receives vibration data and positional data from a set of user devices. The aggregator component 104 analyzes the per-device turbulence data for noise reduction. This filtering compares data received from multiple user devices and sensor data from aircraft sensors to identify events which are not associated with air turbulence. For example, even if a user device registers vibrations, the aircraft server may have data indicating that landing gear was being deployed at the time the vibration was registered. The aircraft server may filter out the user device detected vibrations as due to landing gear movements rather than air turbulence. In this manner, non-turbulence related events are filtered out at both the user device 300 level as well as the aircraft server level.

At 1106, the aggregator component generates quantitative turbulence for the aircraft based on turbulence data generated by multiple user devices in real time while in-flight. At 1108, the aggregator component 104 determines if a threshold transmission time is expired. When the transmission time interval is reached, the aircraft server transmits the quantitative turbulence data for the aircraft tot the prediction component at 1110.

Figure 12:
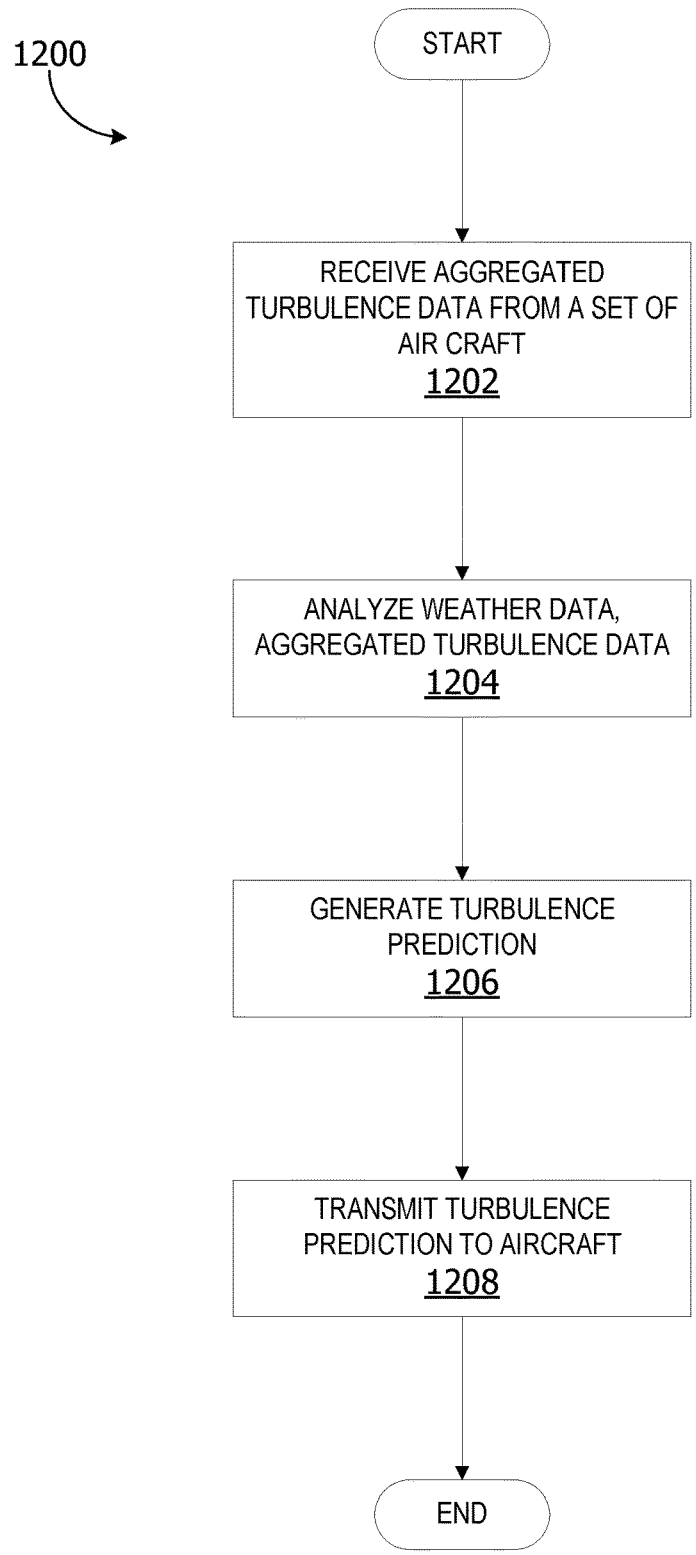
FIG. 12 is a flow chart illustrating an implementation of a prediction component generating a turbulence prediction based on quantitative turbulence data.

FIG. 12 is a flow chart illustrating an implementation of a prediction component 804 generating a turbulence prediction 810 based on quantitative turbulence data. In one implementation, the operations illustrated in FIG. 12 are performed, at least in part, by executing instructions by the one or more processors, such as, but not limited to, the processor 726. At 1202, the prediction component 804 receives quantitative turbulence data from a set of aircraft 818. The prediction component 804 analyzes weather data and the quantitative turbulence data at 1204. The data may be analyzed using machine learning, including pattern recognition to generate the predictions. The prediction component 804 generates a turbulence prediction at 1206. The turbulence prediction is a prediction of a future occurrence of turbulence. The prediction may include the location of the potential turbulence and/or the predicted or likely severity of the turbulence. The prediction may also include a recommendation for the pilot to delay takeoff or landing, reroute, change altitude, fly through, change speed or other corrective action. The GTG system transmits the turbulence prediction to one or more aircraft at operation 1208.

Figure 13:
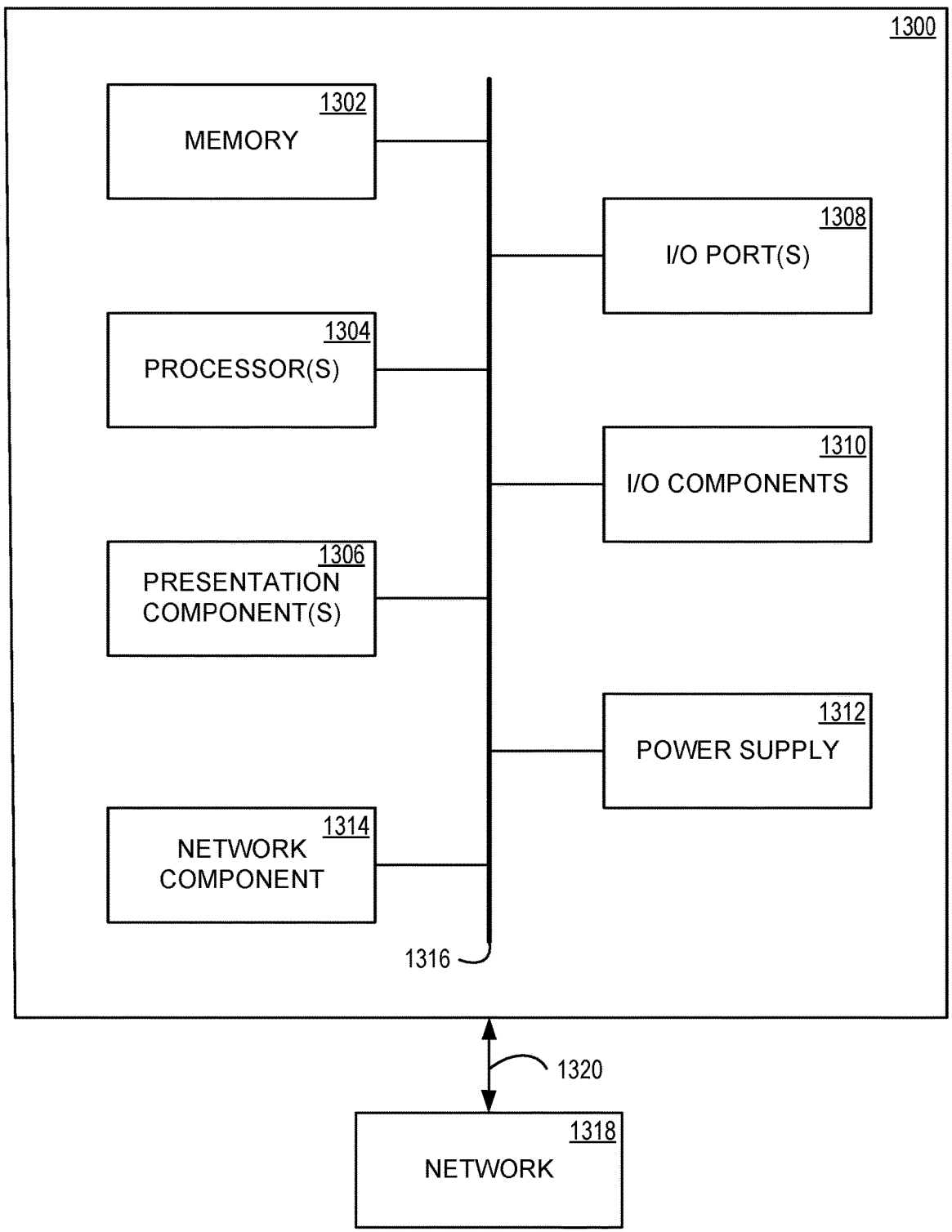
FIG. 13 is a block diagram of a computing device suitable for implementing various aspects of the disclosure.

With reference now to FIG. 13, a block diagram of the computing device 1300 suitable for implementing various aspects of the disclosure is provided. In some implementations, the computing device 1300 includes one or more processors 1304, one or more presentation components 1306 and the memory 1302. The disclosed implementations associated with the computing device 1300 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 13 and the references herein to a "computing device." The disclosed implementations are also practiced in distributed computing environments, where tasks are performed by remote-processing devices that are linked through a communications network. Further, while the computing device 1300 is depicted as a seemingly single device, in one implementation, multiple computing devices work together and share the depicted device resources. For instance, in one implementation, the memory 1302 is distributed across multiple devices, the processor(s) 1304 provided are housed on different devices, and so on.

In one implementation, the memory 1302 includes any of the computer-readable media discussed herein. In one implementation, the memory 1302 is used to store and access instructions configured to carry out the various operations disclosed herein. In some implementations, the memory 1302 includes computer storage media in the form of volatile and/or nonvolatile memory, removable or non-removable memory, data disks in virtual environments, or a combination thereof. In one implementation, the processor(s) 1304 includes any quantity of processing units that read data from various entities, such as the memory 1302 or input/output (I/O) components 1310. Specifically, the processor(s) 1304 are programmed to execute computer-executable instructions for implementing aspects of the disclosure. In one implementation, the instructions are performed by the processor, by multiple processors within the computing device 1300, or by a processor external to the computing device 1300. In some implementations, the processor(s) 1304 are programmed to execute instructions such as those illustrated in the flow charts discussed below and depicted in the accompanying drawings.

The presentation component(s) 1306 present data indications to an operator or to another device. In one implementation, presentation components 1306 include a display device, speaker, printing component, vibrating component, etc. One skilled in the art will understand and appreciate that computer data is presented in a number of ways, such as visually in a graphical user interface (GUI), audibly through speakers, wirelessly between the computing device 1300, across a wired connection, or in other ways. In one implementation, presentation component(s) 1306 are not used when processes and operations are sufficiently automated that a need for human interaction is lessened or not needed. I/O ports 1308 allow the computing device 1300 to be logically coupled to other devices including the I/O components 1310, some of which is built in. Implementations of the I/O components 1310 include, for example but without limitation, a microphone, keyboard, mouse, joystick, game pad, satellite dish, scanner, printer, wireless device, etc.

The computing device 1300 includes a bus 1316 that directly or indirectly couples the following devices: the memory 1302, the one or more processors 1304, the one or more presentation components 1306, the input/output (I/O) ports 1308, the I/O components 1310, a power supply 1312, and a network component 1314. The computing device 1300 should not be interpreted as having any dependency or requirement related to any single component or combination of components illustrated therein. The bus 1316 represents one or more busses (such as an address bus, data bus, or a combination thereof). Although the various blocks of FIG. 13 are shown with lines for the sake of clarity, some implementations blur functionality over various different components described herein.

In some implementations, the computing device 1300 is communicatively coupled to a network 1318 using the network component 1314. In some implementations, the network component 1314 includes a network interface card and/or computer-executable instructions (e.g., a driver) for operating the network interface card. In one implementation, communication between the computing device 1300 and other devices occur using any protocol or mechanism over a wired or wireless connection 1320. In some implementations, the network component 1314 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 1300, implementations of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one implementation, the computer-executable instructions are organized into one or more computer-executable components or modules. Generally, program modules include, but are not limited to, routines, programs, objects, components, and data structures that perform particular tasks or implement particular abstract data types. In one implementation, aspects of the disclosure are implemented with any number and organization of such components or modules. For example, aspects of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one implementation, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 14:
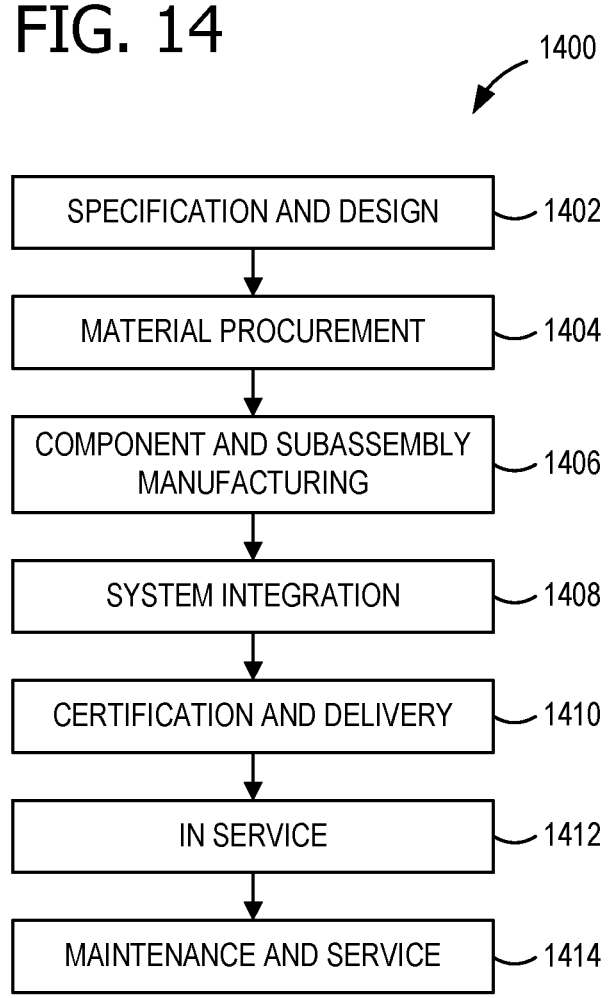
FIG. 14 is a block diagram of an apparatus of manufacturing and service method that advantageously provides quantitative turbulence measuring.
Figure 15:
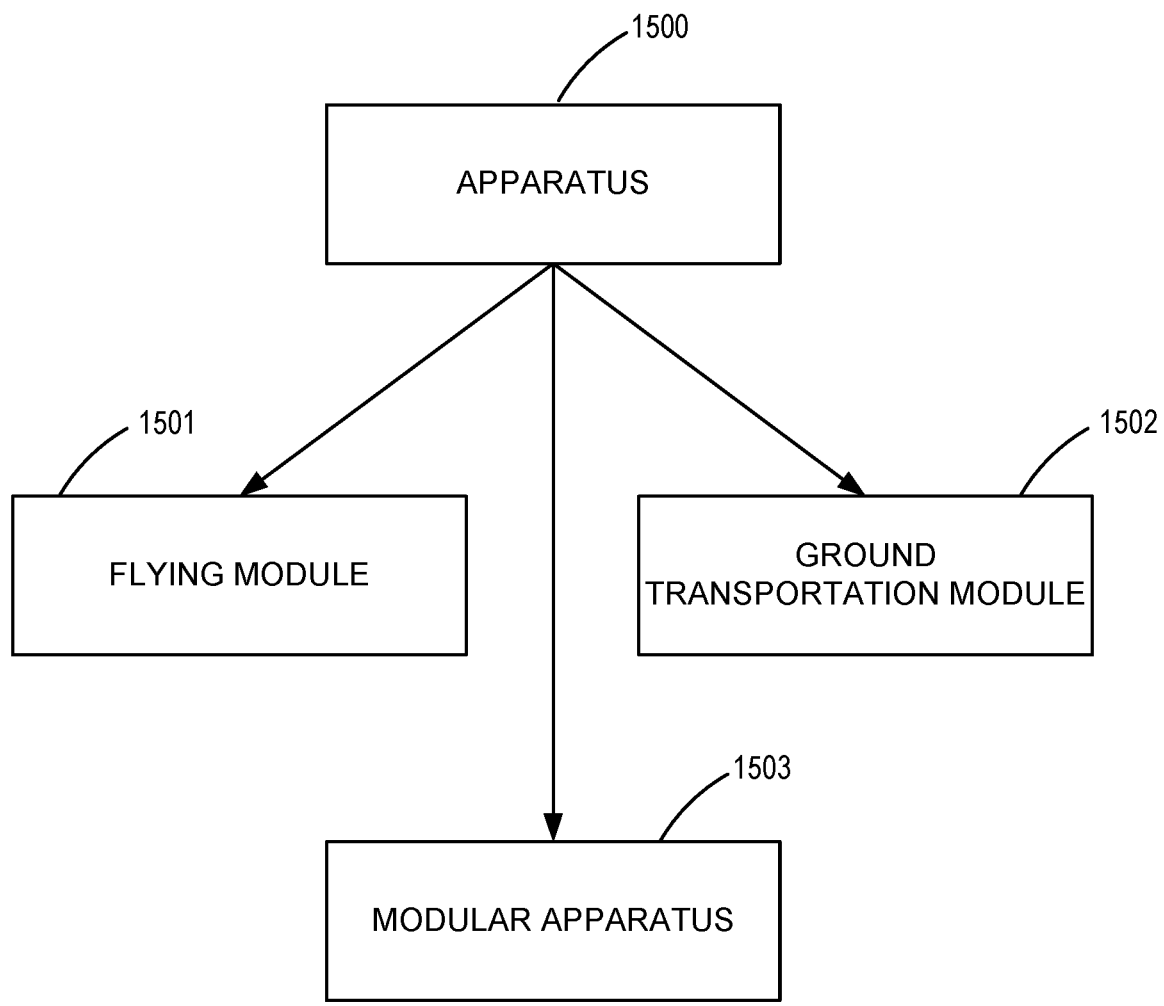
FIG. 15 is a block diagram of an apparatus that advantageously employs automatic and quantitative turbulence measuring.
Figure 16:
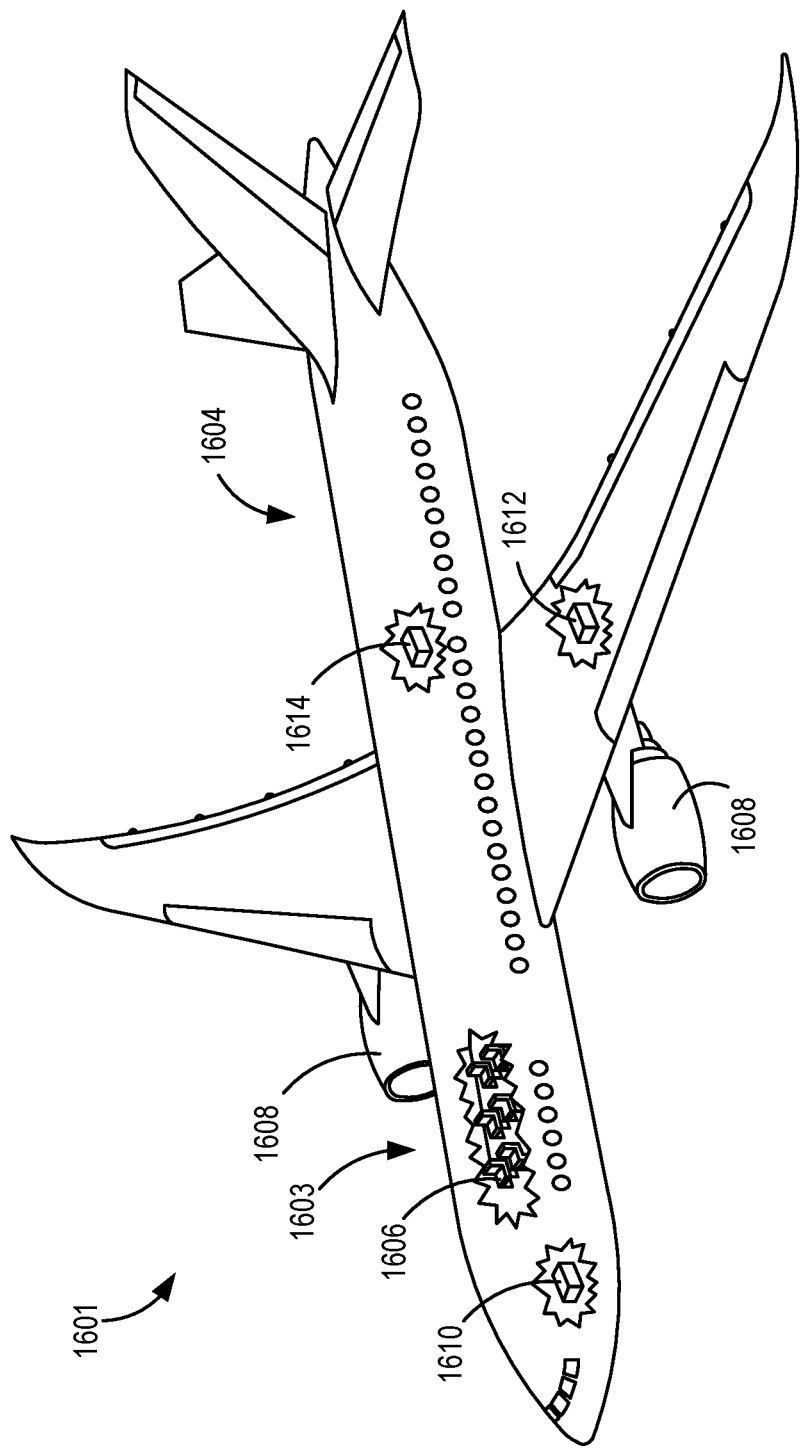
FIG. 16 is a schematic perspective view of a particular flying module.

Some examples of the set of user devices and the aircraft server 116 (of FIG. 1) are used in manufacturing and service applications as shown and described in relation to FIGS. 14-16. Thus, implementations of the disclosure are described in the context of an apparatus of manufacturing and service method 1400 shown in FIG. 14 and apparatus 1500 shown in FIG. 15. In FIG. 14, a diagram illustrating an apparatus manufacturing and service method is depicted in accordance with an implementation. In one implementation, during pre-production, the apparatus manufacturing and service method 1400 includes specification and design 1402 of the apparatus 1500 in FIG. 15 and material procurement 1404. During production, component, and subassembly manufacturing 1406 and system integration 1408 of the apparatus 1500 in FIG. 15 takes place. Thereafter, the apparatus 1500 in FIG. 15 goes through certification and delivery 1410 in order to be placed in service 1412. While in service by a customer, the apparatus 1500 in FIG. 15 is scheduled for routine maintenance and service 1414, which, in one implementation, includes modification, reconfiguration, refurbishment, and other maintenance or service described herein.

In one implementation, each of the processes of the apparatus manufacturing and service method 1400 are performed or carried out by a system integrator, a third party, and/or an operator. In these implementations, the operator is a customer. For the purposes of this description, a system integrator includes any number of apparatus manufacturers and major-system subcontractors; a third party includes any number of venders, subcontractors, and suppliers; and in one implementation, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 15, the apparatus 1500 is provided. As shown in FIG. 15, an example of the apparatus 1500 is a flying module 1501, such as an aerospace vehicle, aircraft, air cargo, flying car, and the like. As also shown in FIG. 15, a further example of the apparatus 1500 is a ground transportation apparatus 1502, such as an automobile, a truck, heavy equipment, construction equipment, a boat, a ship, a submarine, and the like. A further example of the apparatus 1500 shown in FIG. 15 is a modular apparatus 1503 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 16, a more specific diagram of the flying apparatus 1601 is depicted in which an implementation of the disclosure is advantageously employed. In this example, the flying apparatus 1601 is an aircraft produced by the apparatus manufacturing and service method 1400 in FIG. 14 and includes an airframe 1603 with a plurality of systems 1604 and an interior 1606. Implementations of the plurality of systems 1604 include one or more of a propulsion system 1608, an electrical system 1610, a hydraulic system 1612, and an environmental system 1614. However, other systems are also candidates for inclusion. Although an aerospace example is shown, different advantageous implementations are applied to other industries, such as the automotive industry, etc.

The implementations disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed implementations are practiced in a variety of system configurations, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network.

The following paragraphs describe further aspects of the disclosure:

A1. A system for quantitative measurement of air turbulence associated with aircraft, the system comprising:
 a user device associated with a user at a location within an aircraft, the user device comprising a turbulence measuring application generating vibration data and positional data associated with turbulence;
 a server comprising a computer-readable medium storing instructions that are operative upon execution by a processor to:
  aggregate the vibration data and the positional data received from the user device;
  analyze the aggregated data to eliminate noise associated with non-turbulence related vibrations to generate quantitative turbulence data; and
  transmit the quantitative turbulence data to a prediction engine, wherein the quantitative turbulence data is used by the prediction engine in predicting turbulence.

A2. The system of claim 1, wherein the instructions are further operative to:
 transmit the quantitative turbulence data to the prediction engine at an occurrence of a predetermined event.

A3. The system of claim 1, further comprising:
 a noise reduction component associated with a turbulence measuring application on a selected user device, wherein the noise reduction component analyzes vibration data generated by the selected user device to eliminate noise due to non-turbulence-related activity by a selected user associated with the selected user device.

A4. The system of claim 1, wherein the user device is a selected user device from one of a plurality of user devices, the system further comprising:
 a measurement component associated with a selected turbulence measuring application on the selected user device in the plurality of user devices, wherein the measurement component generates the vibration data responsive to a level of detected vibration exceeding a turbulence level threshold.

A5. The system of claim 2, wherein the user device is a selected user device from one of a plurality of user devices, the system further comprising:
 a measurement component associated with a selected turbulence measuring application on the selected user device in the plurality of user devices, wherein the measurement component transmits the vibration data and positional data to an aggregator component responsive to a duration of time generating the vibration data exceeding a transmission threshold.

A6. The system of claim 1, further comprising:
a transmission component associated with the aircraft server, wherein the transmission server transmits the aggregated turbulence data to a computing device associated with a ground station responsive to a time-period since a last transmission exceeding a threshold time.

A7. The system of claim 1, further comprising:
a prediction component, wherein the prediction component analyzes the quantitative turbulence data received from a plurality of aircraft with weather-related data to generate a turbulence prediction.

A8. A method of quantitatively measuring air turbulence associated with aircraft, the method comprising:
generating vibration data and positional data associated with turbulence by each user device in a plurality of user devices associated with a plurality of users at a plurality of different locations within an aircraft, each user device comprising a turbulence measuring application generating the vibration data and the positional data;
aggregating the vibration data and the positional data received from each user device in the plurality of user devices;
analyzing the aggregated data to eliminate noise associated with non-turbulence related vibrations to generate quantitative turbulence data; and
generating a turbulence prediction based on the quantitative turbulence data.

A9. The method of claim 8, further comprising:
transmitting the quantitative turbulence data to a prediction engine for utilization in generating a turbulence prediction at a predetermined frequency.

A10. The method of claim 9, further comprising:
filtering, by a noise reduction component associated with a turbulence measuring application on a selected user device, noise due to non-turbulence-related activity from the vibration data.

A11. The method of claim 9, further comprising:
generating vibration data on a user device responsive to a level of detected vibration exceeding a turbulence level threshold.

A12. The method of claim 8, further comprising:
transmitting the vibration data and positional data to the aggregator component responsive to a duration of time generating vibration data exceeding a transmission threshold.

A13. The method of claim 12, further comprising:
transmitting the aggregated turbulence data to a computing device associated with a ground station responsive to a time-period since a last transmission exceeding a threshold time.

A14. The method of claim 12, further comprising:
analyzing the quantitative turbulence data received from a plurality of aircraft with weather-related data to generate a turbulence prediction.

A15. A computer program product, comprising a computer usable medium having a computer readable program code embodied therein, the computer readable program code adapted to be executed to implement a method for quantitatively measuring air turbulence in aircraft, the method comprising
generating vibration data and positional data associated with turbulence by at least one user device in a plurality of user devices associated with a plurality of users at a plurality of different locations within an aircraft, each user device comprising a turbulence measuring application generating the vibration data and the positional data;
aggregating the vibration data and the positional data received from the at least one user device in the plurality of user devices;
analyzing the aggregated data to eliminate noise associated with non-turbulence related vibrations to generate quantitative turbulence data; and
generating a turbulence prediction based on the quantitative turbulence data generated by a set of aircraft.

A16. The method of claim 15, further comprising:
transmitting the quantitative turbulence data to a prediction engine for utilization in generating a turbulence prediction at a predetermined frequency.

A17. The method of claim 15, further comprising:
filtering, by a noise reduction component associated with a turbulence measuring application on a selected user device, noise due to non-turbulence-related activity from the vibration data.

A18. The method of claim 15, further comprising:
generating vibration data on a user device responsive to a level of detected vibration exceeding a turbulence level threshold.

A19. The method of claim 15, further comprising:
transmitting the vibration data and positional data to the aggregator component responsive to a duration of time generating vibration data exceeding a transmission threshold.

A20. The method of claim 15, further comprising:
transmitting the aggregated turbulence data to a computing device associated with a ground station responsive to a time-period since a last transmission exceeding a threshold time.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for quantitative measurement of air turbulence associated with an aircraft, the system comprising:
a plurality of user computing devices, each user computing device comprising one or more sensor devices configured to generate vibration data responsive to detecting a level of vibration that exceeds a turbulence level threshold and positional data indicating a relative location of the user computing device within a cabin of the aircraft when the vibration data is generated;
an aircraft server computer comprising a computer-readable medium storing aircraft instructions that are operative upon execution by an aircraft processor of the aircraft server computer to:
aggregate vibration data and positional data received from the plurality of user computing devices to generate aggregated data;
process the aggregated data to eliminate noise associated with non-turbulence related vibrations from the aggregated data to generate processed data,
determine eddy dissipation rates at each of the relative locations of the plurality of user computing devices based on the vibration data and the positional data of the processed data, and
generate quantitative turbulence data including a quantitative turbulence value indicating a degree or severity of actual air turbulence encountered by the aircraft during a specific time-period and/or at an identified location based on the eddy dissipation rates at each of the relative locations of the plurality of user computing devices; and
transmit the quantitative turbulence data; and
a computing device comprising a computer-readable medium storing computing instructions that are operative upon execution by a computing processor to:
identify the quantitative turbulence data transmitted from the aircraft server;
generate a turbulence prediction based on in the quantitative turbulence data, wherein the turbulence prediction specifies a prediction of a future occurrence of turbulence; and
generate a corrective action to avoid the future occurrence of turbulence, wherein the corrective action is performed by the aircraft to avoid the future occurrence of turbulence.

2. The system of claim 1, wherein the aircraft instructions are further operative to:
transmit the quantitative turbulence data to the computing device at an occurrence of a predetermined event.

3. The system of claim 1, wherein the plurality of user computing devices include noise reduction components that analyze the vibration data generated by the one or more sensor devices of the plurality of user computing devices to eliminate noise due to non-turbulence-related activity by users associated with the user computing devices.

4. The system of claim 1, wherein each user computing device of the plurality of user computing devices includes a measurement component that is configured to transmit at least part of the vibration data and the positional data to an aggregator component responsive to a duration of time generating the at least part of vibration data exceeding a transmission threshold.

5. The system of claim 1,
wherein the aircraft server includes a transmission component that transmits aggregated turbulence data to the computing device responsive to a time-period since a last transmission exceeding a threshold time, wherein the computing device is associated with a ground station.

6. The system of claim 1,
wherein the computing instructions are further operative to analyze the quantitative turbulence data with weather-related data to generate the turbulence prediction.

7. A method of quantitatively measuring air turbulence associated with an aircraft, the method comprising:
for each user computing device of a plurality of user computing devices, generating, via one or more sensor devices of the user computing device, vibration data responsive to detecting a level of vibration that exceeds a turbulence level threshold and positional data indicating a relative location of the user computing device within a cabin of the aircraft when the vibration data is generated;
aggregating vibration data and positional data received from the plurality of user computing devices to generate aggregated data;
processing the aggregated data to eliminate noise associated with non-turbulence related vibrations from the aggregated data to generate processed data;
determine eddy dissipation rates at each of the relative locations of the plurality of user computing devices based on the vibration data and the positional data of the processed data;
generating quantitative turbulence data including a quantitative turbulence value indicating a degree or severity of actual air turbulence encountered by the aircraft during a specific time-period and/or at an identified location based on the eddy dissipation rates at each of the relative locations of the plurality of user computing devices;
generating a turbulence prediction based on the quantitative turbulence data, wherein the turbulence prediction specifies a prediction of a future occurrence of turbulence; and
generate a corrective action to avoid the future occurrence of turbulence, wherein the corrective action is performed by the aircraft to avoid the future occurrence of turbulence.

8. The method of claim 7, further comprising:
transmitting the quantitative turbulence data to a prediction engine for utilization in generating the turbulence prediction at a predetermined frequency.

9. The method of claim 7, further comprising:
filtering, by noise reduction components of the plurality of user computing devices, noise due to non-turbulence-related activity from the vibration data.

10. The method of claim 7, further comprising:
transmitting the vibration data and the positional data to an aggregator component responsive to a duration of time generating the vibration data exceeding a transmission threshold.

11. The method of claim 7, further comprising:
transmitting aggregated turbulence data to a computing device associated with a ground station responsive to a time-period since a last transmission exceeding a threshold time.

12. The method of claim 7, further comprising:
analyzing the quantitative turbulence data received from a plurality of aircraft with weather-related data to generate the turbulence prediction.

13. A method of quantitatively measuring air turbulence associated with an aircraft, the method comprising:
for each computing device of a plurality of computing devices distributed in fixed location within the aircraft, generating, via one or more sensor devices of the computing device, vibration data responsive to detecting a level of vibration that exceeds a turbulence level threshold and positional data indicating a relative location of the computing device within the aircraft;
aggregating vibration data and positional data received from the plurality of computing devices to generate aggregated data;
processing the aggregated data to eliminate noise associated with non-turbulence related vibrations from the aggregated data to generate processed data;

determining eddy dissipation rates at each of the relative locations of the plurality of computing device based on the vibration data and the positional data of the processed data;

generating quantitative turbulence data including a quantitative turbulence value indicating a degree or severity of actual air turbulence encountered by the aircraft during a specific time-period and/or at an identified location based on the eddy dissipation rates at each of the relative locations of the plurality of computing devices;

generating a turbulence prediction based on the quantitative turbulence data, wherein the turbulence prediction specifies a prediction of a future occurrence of turbulence; and generating a corrective action to avoid the future occurrence of turbulence, wherein the corrective action is performed by the aircraft to avoid the future occurrence of turbulence.

14. The method of claim 13, further comprising:
transmitting the quantitative turbulence data to a prediction engine for utilization in generating the turbulence prediction at a predetermined frequency.

15. The method of claim 13, further comprising:
filtering, by noise reduction components of the plurality of computing devices, noise due to non-turbulence-related activity from the vibration data.

16. The method of claim 13, further comprising:
transmitting the vibration data and the positional data to an aggregator component responsive to a duration of time generating the vibration data exceeding a transmission threshold.

17. The method of claim 13, further comprising:
transmitting aggregated turbulence data to a computing device associated with a ground station responsive to a time-period since a last transmission exceeding a threshold time.

18. The system of claim 1, wherein the one or more sensors include one or more of a gyroscope, accelerometer, magnetometer, global positioning satellite (GPS) system, barometer, proximity sensor, ambient light sensor, and wherein the corrective action includes at least one of delaying takeoff or landing of the aircraft, reroute a flight path of the aircraft, changing altitude of the aircraft, and changing a speed of the aircraft.

19. The method of claim 7, wherein the one or more sensors include one or more of a gyroscope, accelerometer, magnetometer, global positioning satellite (GPS) system, barometer, proximity sensor, ambient light sensor, and wherein the corrective action includes at least one of delaying takeoff or landing of the aircraft, reroute a flight path of the aircraft, changing altitude of the aircraft, and changing a speed of the aircraft.

20. The method of claim 13, wherein the one or more sensors include one or more of a gyroscope, accelerometer, magnetometer, global positioning satellite (GPS) system, barometer, proximity sensor, ambient light sensor, and wherein the corrective action includes at least one of delaying takeoff or landing of the aircraft, reroute a flight path of the aircraft, changing altitude of the aircraft, and changing a speed of the aircraft.

* * * * *